(12) United States Patent
Niakan et al.

(10) Patent No.: US 11,745,129 B2
(45) Date of Patent: *Sep. 5, 2023

(54) AIR INTAKE ASSEMBLY AND METHODS THEREOF

(71) Applicant: Advanced FLOW Engineering inc., Corona, CA (US)

(72) Inventors: Shahriar Nick Niakan, Anaheim Hills, CA (US); Christian L. Landel, Corona, CA (US)

(73) Assignee: Advanced FLOW Engineering Inc., Corona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,863

(22) Filed: May 11, 2022

(65) Prior Publication Data
US 2022/0266183 A1    Aug. 25, 2022

Related U.S. Application Data

(60) Division of application No. 16/570,024, filed on Sep. 13, 2019, now Pat. No. 11,331,607, which is a
(Continued)

(51) Int. Cl.
*B01D 46/00* (2022.01)
*B01D 46/24* (2006.01)
(Continued)

(52) U.S. Cl.
CPC ..... *B01D 46/0002* (2013.01); *B01D 46/0005* (2013.01); *B01D 46/2411* (2013.01);
(Continued)

(58) Field of Classification Search
CPC .............. B01D 46/521; B01D 46/0012; B01D 46/0005; B01D 46/2414; B01D 2279/60; B01D 2265/02; B01D 2265/028; B01D 2277/20; B01D 2275/201; B01D 2275/208; F02M 35/02416; F02M 35/0203;
(Continued)

(56) References Cited

U.S. PATENT DOCUMENTS 3,090,490 A    5/1963 Yocum
3,572,014 A    3/1971 Hansen
(Continued)

*Primary Examiner* — Minh Chau T Pham
(74) *Attorney, Agent, or Firm* — Ravi Mohan; Rutan & Tucker, LLP

(57) ABSTRACT

Disclosed herein are air intake assemblies for internal combustion engines. In some embodiments, an air intake assembly includes an air filter configured to produce filtered air, a sealed filter housing configured to house the air filter therein, and an intake tube configured to convey the filtered air to an internal combustion engine. The filter housing includes an air intake port configured to provide intake air to the air filter. The air filter is configured to remove particulate matter from the intake air and produce the filtered air. The air filter includes a multi-component coupling interface configured to accept an intake-end portion of the intake tube in the coupling interface. The filter housing includes an aperture configured to accept the coupling interlace of the air filter in the aperture. Also disclosed herein are methods of the air intake assemblies.

20 Claims, 19 Drawing Sheets

Related U.S. Application Data continuation of application No. 16/567,444, filed on Sep. 11, 2019, now Pat. No. 11,376,536, which is a continuation of application No. 16/564,790, filed on Sep. 9, 2019, now Pat. No. 11,219,850, which is a continuation of application No. 16/561,512, filed on Sep. 5, 2019, now Pat. No. 11,135,538, which is a continuation-in-part of application No. 16/351,316, filed on Mar. 12, 2019, now Pat. No. 10,532,304, which is a continuation of application No. 14/999,710, filed on Jun. 17, 2016, now Pat. No. 10,252,202, which is a continuation of application No. 13/694,159, filed on Nov. 1, 2012, now Pat. No. 9,440,175.

(51) Int. Cl.
*F02M 35/02* (2006.01)
*F02M 35/024* (2006.01)
*F16L 21/00* (2006.01)

(52) U.S. Cl.
CPC .... *F02M 35/0201* (2013.01); *F02M 35/0202* (2013.01); *F02M 35/02475* (2013.01); *F16L 21/002* (2013.01); *B01D 2275/201* (2013.01); *B01D 2279/60* (2013.01)

(58) Field of Classification Search
CPC .......... F02M 35/0204; F02M 35/0209; F02M 35/0245; F02M 35/10321
USPC .............. 55/319, 385.3; 123/198 E; 181/206
See application file for complete search history.

(56) References Cited

U.S. PATENT DOCUMENTS

| | | | | |
|---|---|---|---|---|
| 3,747,303 | A | 7/1973 | Jordan | |
| 4,259,096 | A | 3/1981 | Nakamura et al. | |
| 4,279,630 | A | 7/1981 | Nakamura et al. | |
| 4,314,832 | A | 2/1982 | Fox | |
| 4,322,230 | A | 3/1982 | Schoen et al. | |
| 5,275,636 | A * | 1/1994 | Dudley | B01D 46/2414 55/502 |
| 5,487,767 | A * | 1/1996 | Brown | B01D 46/4227 55/482 |
| 6,152,996 | A | 11/2000 | Linnersten et al. | |
| 6,811,588 | B2 | 11/2004 | Niakin | |
| 7,537,648 | B1 * | 5/2009 | Karwacki | B01D 46/0086 96/417 |
| 7,645,329 | B2 | 1/2010 | Niakan et al. | |
| 9,440,175 | B2 | 9/2016 | Niakan et al. | |
| 9,861,922 | B1 * | 1/2018 | Townsend | B01D 46/0005 |
| 10,252,202 | B2 | 4/2019 | Niakan et al. | |
| 10,532,304 | B2 | 1/2020 | Niakan et al. | |
| 11,331,607 | B2 * | 5/2022 | Niakan | F02M 35/02475 |
| 11,376,536 | B2 * | 7/2022 | Niakan | B01D 46/0002 |
| 2006/0107836 | A1 | 5/2006 | Maier et al. | |
| 2006/0260469 | A1 * | 11/2006 | Miyagishima | F02M 35/02483 55/385.3 |
| 2008/0060524 | A1 | 3/2008 | Tumbrink et al. | |
| 2014/0208701 | A1 | 7/2014 | Neu et al. | |

* cited by examiner

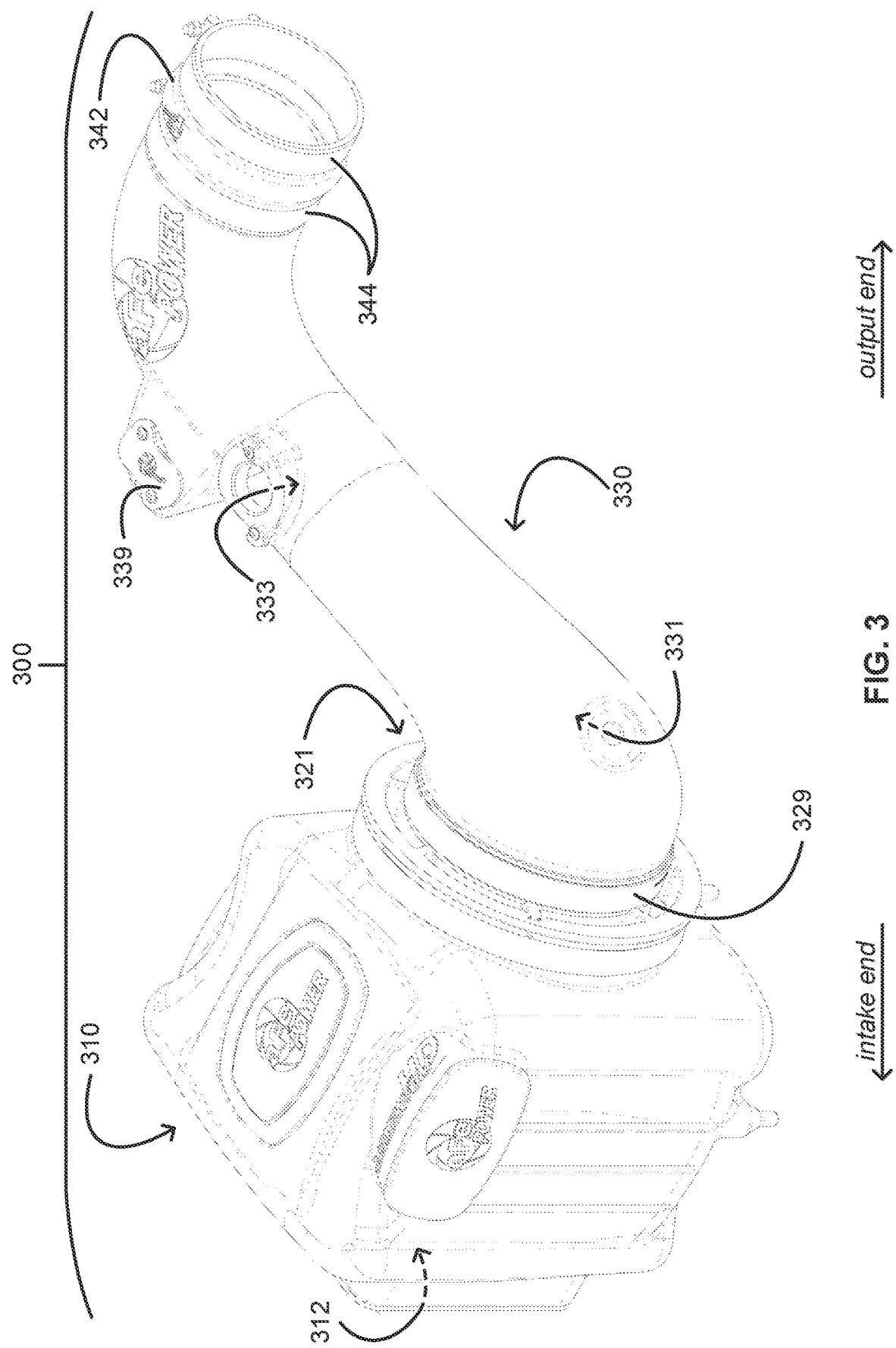

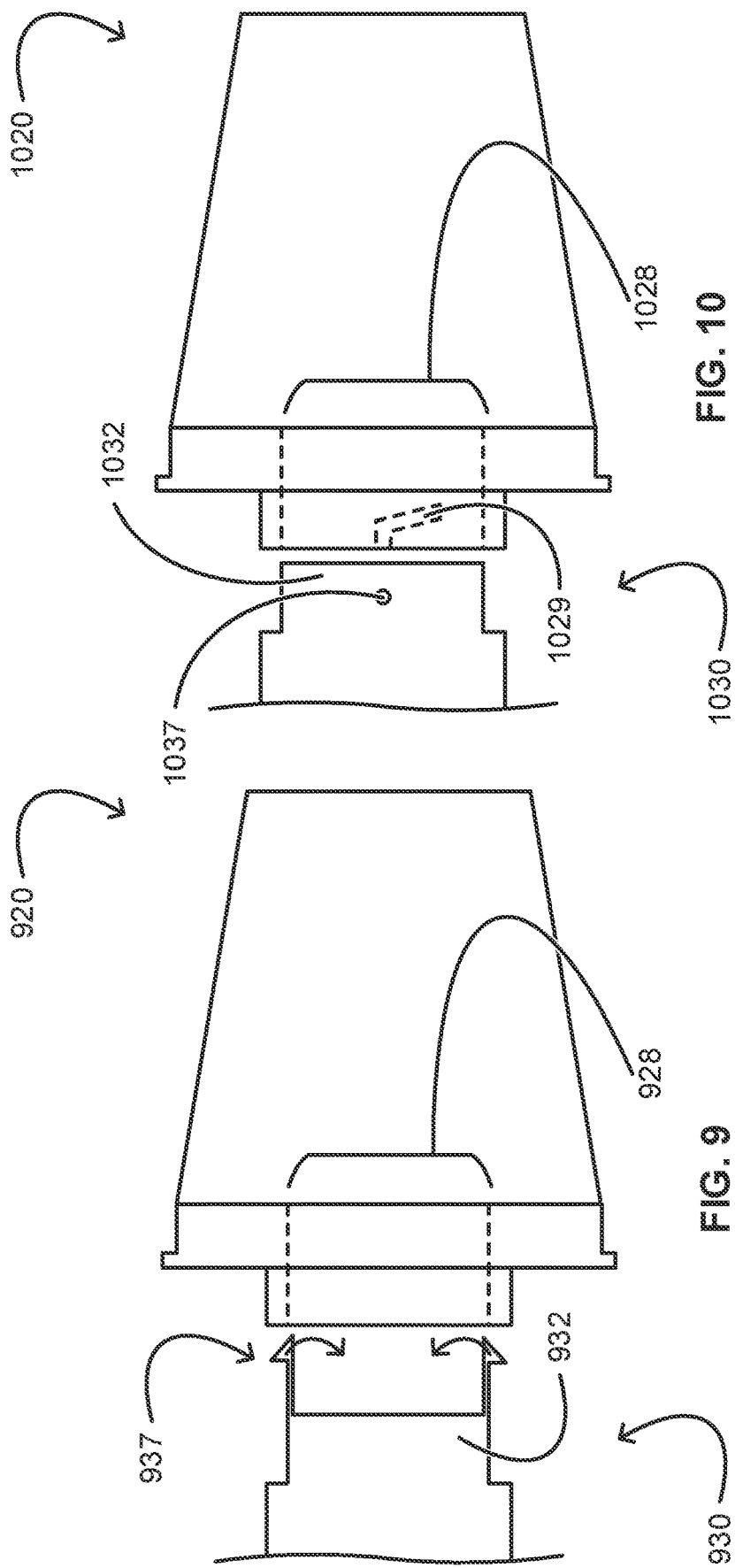

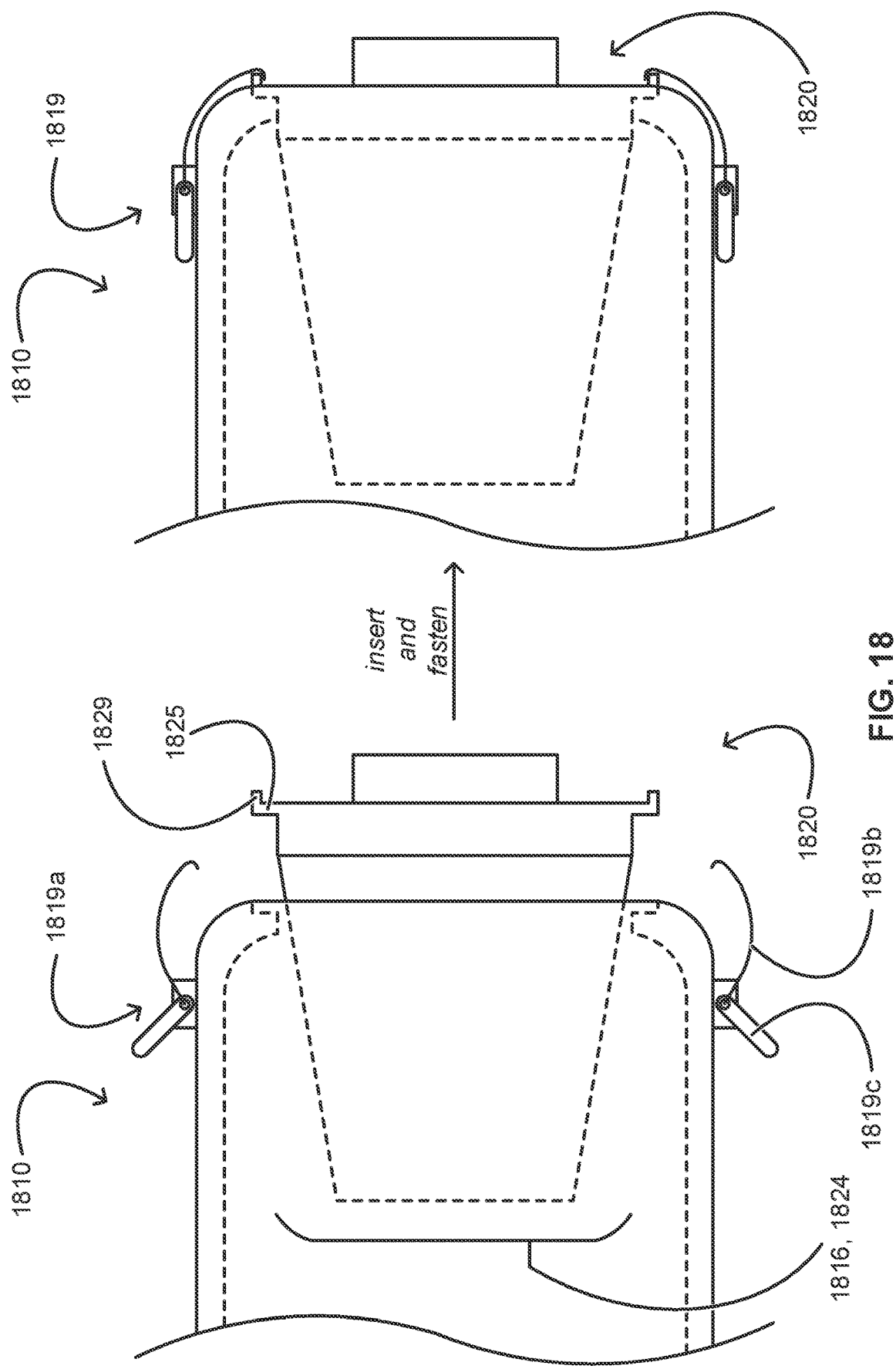

AIR INTAKE ASSEMBLY AND METHODS THEREOF

PRIORITY

This application is a Divisional of U.S. patent application Ser. No. 16/570,024, filed Sep. 13, 2019, now U.S. Pat. No. 11,331,607 B2, which is a Continuation of U.S. patent application Ser. No. 16/567,444, filed Sep. 11, 2019, now U.S. Pat. No. 11,376,536 B2, which is a Continuation of U.S. patent application Ser. No. 16/564,790, filed Sep. 9, 2019, now U.S. Pat. No. 11,219,850, which is a Continuation of U.S. patent application Ser. No. 16/561,512, filed Sep. 5, 2019, now U.S. Pat. No. 11,135,538, which is a Continuation-in-Part of U.S. patent application Ser. No. 16/351,316, filed Mar. 12, 2019, now U.S. Pat. No. 10,532,304, which is a Continuation of U.S. patent application Ser. No. 14/999,710, filed Jun. 17, 2016, now U.S. Pat. No. 10,252,202, which is a Continuation of and claims the benefit of priority to U.S. patent application Ser. No. 13/694,159, filed Nov. 1, 2012, now U.S. Pat. No. 9,440,175, each of which is incorporated herein by reference in its entirety.

BACKGROUND

The primary function of an air filter for an internal combustion engine is to reduce the amount of particulate matter that might otherwise enter the engine. In practice, unfiltered air is directed through the air filter, which captures the particular matter in filter media thereof, and filtered air is subsequently directed into the engine. If not captured by the air filter, the particulate matter can cause significant damage to the engine mandating expensive repairs.

In the past, an air filter was most commonly placed in an engine compartment of a motor vehicle in close proximity to the internal combustion engine for which the air filter provided filtered air. However, as such an engine operates, the engine gives off heat, thereby heating the air in the engine compartment and making the air available to the air filter hotter than the air outside the engine compartment. It is known that cooler air is more dense than hotter air, so a volume of the cooler air includes more air (i.e., more moles of $N_2$, $O_2$, Ar, $CO_2$, etc.) than the same volume of the hotter air. Because more air includes more combustion-supporting oxygen, a number of approaches have since been employed to increase the power of internal combustion engines by reducing the temperature of the air available to air filters for intake air.

One approach in reducing the temperature of the air available to air filters for intake air includes separating the intake air from the rest of the air in an engine compartment with an air intake assembly including a filter housing having one or more walls forming a partial enclosure around an air filter. Such a filter housing is referred to as an open-element filter housing. In accordance with the same approach, the air intake assembly alternatively includes a filter housing forming a substantially complete enclosure around the air filter. Notwithstanding an air intake port in the filter housing, such a filter housing is referred to as a sealed filter housing. FIGS. 19-21 illustrate air intake assemblies having open-element filter housings, while FIG. 22 illustrates an intake assembly having a sealed filter housing.

FIG. 19 illustrates an air intake assembly 1900 with a first type of open-element finer housing 1910 configured to separate intake air from other air in an engine compartment. The air intake assembly 1900 includes an air filter 1920 separated from the engine compartment by the filter housing 1910. The air intake assembly 1900 also includes an intake tube 1930 coupled to the air filter 1920 through the filter housing 1910. The filter housing 1910 is designed such that a hood of a vehicle forms a top cover of the filter housing 1910 when the hood of the vehicle is closed. A back and a side of an engine compartment of the vehicle likewise forms a back and a side cover of the filter housing 1910. The air intake assembly 1900 benefits from being relatively easy to install and maintain compared to, for example, an air intake assembly having a sealed filter housing; however, the air intake assembly 1900 is not as efficient as the air intake assembly with the sealed filter housing in isolating the air filter 1920 from air in an engine compartment.

FIG. 20 illustrates an air intake assembly 2000 with a second type of open-element filter housing 2010 configured to separate intake air from other air in an engine compartment. The air intake assembly 2000 includes an air filter 2020 separated from the engine compartment by the filter housing 2010. The air intake assembly 2000 also includes an intake tube 2030 coupled to the air filter 2020 through the filter housing 2010. Like the filter housing 1910 of the air intake assembly 1900, the filter housing 2010 is designed such that a hood of a vehicle forms a top cover of the filter housing 2010 when the hood of the vehicle is closed. A back and a side of an engine compartment of the vehicle likewise forms a back and a side cover of the filter housing 2010. Again, an air intake assembly such as the air intake assembly 2000 benefits from being relatively easy to install and maintain, but the air intake assembly 2000 is not as efficient as an air intake assembly with a sealed filter housing in isolating the air filter 2020 from air in an engine compartment.

FIG. 21 illustrates an air intake assembly 2100 with a third type of open-element filter housing 2110 configured to separate intake air from other air in an engine compartment. The air intake assembly 2100 includes an air filter 2120 separated from the engine compartment by the filter housing 2110. The air intake assembly 2100 also includes an intake tube 2130 coupled to the air filter 2120 through the finer housing 2110. Like the filter housing 1910 and the filter housing 2010 respectively of the air intake assembly 1900 and the air intake assembly 2000, the filter housing 2110 is designed such that a hood of a vehicle forms a top cover of the filter housing 2110 when the hood of the vehicle is closed. A back and a side of an engine compartment of the vehicle likewise forms a back and a side cover of the filter housing 2110. Again, an air intake assembly such as the air intake assembly 2100 benefits from being relatively easy to install and maintain, but the air intake assembly 2100 is not as efficient as an air intake assembly with a sealed filter housing in isolating the air filter 2120 from air in an engine compartment. This is particularly evident in view of an aperture 2112 formed in the filter housing 2110 of the air intake assembly 2100. The aperture 2112 is configured to allow the intake tube 2130 to pass therethrough and couple with the air filter 2120, but the aperture 2112 also allows air from an engine compartment to readily pass therethrough reducing an effectiveness of separating intake air from other air in the engine compartment with the filter housing 2110.

FIG. 22 illustrates an air intake assembly 2200 with a two-piece sealed filter housing configured to separate intake air from other air in an engine compartment. The air intake assembly 2200 includes an air filter (not shown) substantially separated from the engine compartment by the two-piece sealed filter housing formed by a filter housing top 2232 integrated with intake tube 2230 coupled to a filter housing body 2210. The air intake assembly 2200 benefits from being more efficient in isolating the air filter thereof from air in an engine compartment compared to, for example, an air intake assembly having an open-element filter housing such as any air intake assembly of the air intake assemblies 1900, 2000, and 2100; however, the air intake assembly 2200 is not as easy to install or maintain compared to any of the foregoing air intake assemblies having the open-element filter housing. This is particularly evident in view of at least screws 2202 of the air intake assembly 2200 that are needed to couple the filter housing top 2232 to the filter housing body 2210 to form the two-piece sealed filter housing. Periodic replacement of the air filter as part of routine service or maintenance of the air intake assembly 2200 requires each screw of the screws 2202 to be sequentially removed before removing the filter housing top 2232 from the filter housing body 2210 and accessing an existing air filter therein. After replacing the existing air filter with a new air filter, each screw of the screws 2202 needs to be sequentially replaced when coupling the filter housing top 2232 to the filter housing body 2210 to form the two-piece sealed filter housing, thereby requiring more time and effort than simply opening a hood of a vehicle and replacing an existing air filter with a new air filter as with the air intake assemblies 1900, 2000, and 2100.

In view of the foregoing, an air intake assembly is needed that efficiently separates intake air for an air filter from other air in an engine compartment of a vehicle. In addition, an air intake assembly is needed that provides relatively easy installation and maintenance of the air intake assembly. Disclosed herein are air intake assemblies and methods thereof that address at least the foregoing needs.

SUMMARY

Disclosed herein is an air intake assembly for an internal combustion engine including, in some embodiments, an air filter configured to produce filtered air, a sealed filter housing configured to house the air filter therein, and an intake tube configured to convey the filtered air to the internal combustion engine. The filter housing includes an air intake port configured to provide intake air to the air filter. The air filter is configured to remove particulate matter from the intake air and produce the filtered air. The air filter includes a multi-component coupling interface configured to accept an intake-end portion of the intake tube in the coupling interface. The filter housing includes an aperture configured to accept the coupling interface of the air filter in the aperture.

In some embodiments, the coupling interface of the air filter includes an inner annular member defining a coupling-interface socket and the intake-end portion of the intake tube includes an intake-tube spigot. The coupling-interface socket is configured to seat the intake-tube spigot therein with at least a clearance engineering fit.

In some embodiments, the intake-tube spigot has a smaller outer diameter than a remainder of the intake-end portion of the intake tube. A larger outer diameter of the remainder of the intake-end portion of the intake tube provides a shouldered stop configured to prevent over-insertion of the intake-tube spigot into the coupling-interface socket.

In some embodiments, the coupling-interface socket includes a circumferential groove and the intake-tube spigot includes a circumferential protrusion. The circumferential groove is configured to seat the circumferential protrusion therein with at least a clearance engineering fit.

In some embodiments, the aperture of the filter housing includes a lip around the aperture defining a filter-housing socket and the coupling interface of the air filter includes an outer annular member defining a coupling-interface spigot. The filter-housing socket is configured to seat the coupling-interface spigot therein with at least a clearance engineering fit.

In some embodiments, the coupling-interface spigot includes an annular shoulder providing a stop configured to prevent over-insertion of the coupling-interface spigot into the filter-housing socket.

In some embodiments, the lip around the aperture of the filter housing includes a pair of opposing annular shoulders defining a clamp seat over the filter-housing socket.

In some embodiments, the lip around the aperture of the filter housing includes one or more transverse slits dividing the lip into one or more respective deformable lip pieces. The lip pieces are configured to deform toward a central axis of the filter-housing socket when a clamp in the clamp seat is tightened.

In some embodiments, the coupling interface of the air filter includes an inner annular member defining a coupling-interface socket and an outer annular member defining a coupling-interface, spigot. Intake-end portions of the inner annular member and the outer annular member of the coupling interface are connected by a shared annular shoulder.

In some embodiments, the coupling-interface socket is configured to seat therein an intake-tube spigot of the intake-end portion of the intake tube with at least a clearance engineering fit. The aperture of the filter housing includes a lip around the aperture defining a filter-housing socket configured to seat therein the coupling-interface spigot with at least a clearance engineering fit.

In some embodiments, the air intake assembly further includes a hump coupler and at least two clamps configured to couple an output-end portion of the intake tube to an intake-end portion of an engine intake or a component thereof.

In some embodiments, dimensions of the air intake assembly vary in accordance with space available in engine compartments of different makes and models of motor vehicles.

Also disclosed herein is an air intake assembly for an internal combustion engine including, in some embodiments, an air filter configured to produce filtered air, a sealed filter housing configured to house the air filter therein, and an intake tube configured to convey the filtered air to the internal combustion engine. The filter housing includes an air intake port configured to provide intake air to the air filter. The air filter is configured to remove particulate matter from the intake air and produce the filtered air. The air filter includes a multi-component coupling interface having an inner annular member defining a coupling-interface socket and an outer annular member defining a coupling-interface spigot. The filter housing includes a lip around an aperture defining a filter-housing socket configured to seat therein the coupling-interface spigot with at least a clearance engineering fit. An intake-end portion of the intake tube includes an intake-tube spigot configured to sit in the coupling-interface socket with at least a clearance engineering fit.

In some embodiments, intake-end portions of the inner annular member and the outer annular member of the coupling interface are connected by a shared annular shoulder.

In some embodiments, the coupling-interface spigot includes an annular shoulder providing a stop configured to prevent over-insertion of the coupling-interface spigot into the filter-housing socket.

In some embodiments, the intake-tube spigot has a smaller outer diameter than a remainder of the intake-end portion of the intake tube. A larger outer diameter of the remainder of the intake-end portion of the intake tube provides a shouldered stop configured to prevent over-insertion of the intake-tube spigot into the coupling-interface socket.

In some embodiments, the intake-tube spigot includes a circumferential protrusion and the coupling-interface socket includes a circumferential groove. The circumferential protrusion is configured to sit within the circumferential groove with at least a clearance engineering fit.

In some embodiments, the lip around the aperture of the filter housing includes a pair of opposing annular shoulders defining a clamp seal over the filter-housing socket. The lip around the aperture includes one or more transverse slits dividing the lip into one or more respective deformable lip pieces. The lip pieces are configured to deform toward a central axis of the filter-housing socket when a clamp in the clamp seat is tightened.

Also disclosed herein is an air intake assembly for an internal combustion engine including, in some embodiments, an air filter configured to produce filtered air, a sealed filter housing configured to house the air filter therein, an intake tube configured to convey the filtered air to the internal combustion engine, and a hump coupler and at least two clamps configured to couple an output-end portion of the intake tube to an intake-end portion of an engine intake or a component thereof. The filter housing includes an air intake port configured to provide intake air to the air filter. The air filter is configured to remove particulate matter from the intake air and produce the filtered air. The air filter includes a multi-component coupling interface having an inner annular member defining a coupling-interface socket and an outer annular member defining a coupling-interface spigot. Intake-end portions of the inner annular member and the outer annular member of the coupling interface are connected by a shared annular shoulder. The filter housing includes a lip around an aperture defining a filter-housing socket configured to seat therein the coupling-interface spigot with at least a clearance engineering fit. An intake-end portion of the intake tube includes an intake-tube spigot configured to sit in the coupling-interface socket with at least a clearance engineering fit.

In some embodiments, the coupling-interface spigot includes an annular shoulder providing a stop configured to prevent over-insertion of the coupling-interface spigot into the filter-housing socket.

In some embodiments, the intake-tube spigot has a smaller outer diameter than a remainder of the intake-end portion of the intake tube. A larger outer diameter of the remainder of the intake-end portion of the intake tube provides a shouldered stop configured to prevent over-insertion of the intake-tube spigot into the coupling-interface socket.

Also disclosed herein is an air intake assembly for an internal combustion engine having a reduced part count. The air intake assembly includes, in some embodiments, an air filter configured to remove particulate matter from intake air to produce filtered air, a sealed filter housing configured to house the air filter therein, and an intake tube configured to convey the filtered air to the internal combustion engine. The air filter includes a multi-component coupling interface. The coupling interface is configured to seat an intake-end portion of the intake tube in the coupling interface with at least a clearance engineering fit. The clearance engineering fit obviates a need for any fastening hardware to couple the air filter and the intake tube together, thereby providing at least part of the reduced part count for the air intake assembly. The filter housing includes an aperture and an air intake port. The aperture of the filter housing is configured to seat the coupling interface of the air filter in the aperture. The air intake port is configured to provide the intake air to the air filter.

In some embodiments, the coupling interface of the air filter includes an inner annular member defining a coupling-interface socket and the intake-end portion of the intake tube includes an intake-tube spigot. The coupling-interface socket is configured to seat the intake-tube spigot therein.

In some embodiments, the coupling-interface socket includes a circumferential groove and the intake-tube spigot includes a circumferential protrusion. The circumferential groove is configured to seat the circumferential groove therein.

In some embodiments, the air intake assembly further includes an optional hose clamp configured for fastening the air filter and the intake tube together. An outer perimeter of the inner annular member of the air filter includes a clamp seat for the optional hose clamp.

In some embodiments, the aperture of the filter housing includes a lip around the aperture defining a filter-housing socket and the coupling interface of the air filter includes an outer annular member defining a coupling-interface spigot. The filter-housing socket is configured to seat the coupling-interface spigot therein with at least a clearance engineering fit. The clearance engineering fit obviates a need for any fastening hardware to couple the filter housing and the air filter together, thereby further providing at least part of the reduced part count for the air intake assembly.

In some embodiments, the lip around the aperture of the filter housing extends into the filter housing forming an integrated clamp. The integrated clamp is configured to clamp the coupling-interface spigot in the filter-housing socket.

In some embodiments, the lip around the aperture of the filter housing extends away from the filter housing forming a clamp seat. The lip includes one or more transverse slits dividing the lip into one or more respective deformable lip pieces.

In some embodiments, the air intake assembly further includes an optional hose clamp configured for fastening the filter housing and the air filter together. The lip pieces around the aperture of the filter housing are configured to deform toward a central axis of the filter-housing socket when the optional hose clamp is tightened in the clamp seat.

Also disclosed herein is an air intake assembly for an internal combustion engine having a reduced part count. The air intake assembly includes, in some embodiments, an air filter configured to remove particulate matter from intake air to produce filtered air, a sealed filter housing configured to house the air filter therein, and an intake tube configured to convey the filtered air to the internal combustion engine. The air filter includes a multi-component coupling interface. The coupling interface is configured to seat an intake-end portion of the intake tube in the coupling interface. The filter housing includes an aperture and an air intake port configured to provide the intake air to the air filter. The aperture of the filter housing is configured to seat the coupling interface of the air filter in the aperture with at least a clearance engineering fit. The clearance engineering fit obviates a need for any fastening hardware to couple the filter housing and the air filter together, thereby providing at least part of the reduced part count for the air intake assembly.

In some embodiments, the aperture of the filter housing includes a lip around the aperture defining a filter-housing socket and the coupling interface of the air filter includes an outer annular member defining a coupling-interface spigot. The filter-housing socket is configured to seat the coupling-interface spigot therein.

In some embodiments, the lip around the aperture of the filter housing extends into the filter housing forming an integrated clamp. The integrated clamp is configured to clamp the coupling-interface spigot in the filter-housing socket.

In some embodiments, the coupling interface of the air filter includes an inner annular member defining a coupling-interface socket and the intake-end portion of the intake tube includes an intake-tube spigot. The coupling-interface socket is configured to seat the intake-tube spigot therein with at least a clearance engineering fit. The clearance engineering fit obviates a need for any fastening hardware to couple the air filter and the intake tube together, thereby further providing at least part of the reduced part count for the air intake assembly.

In some embodiments, the coupling-interface socket includes a circumferential groove and the intake-tube spigot includes a circumferential protrusion. The circumferential groove is configured to seat the circumferential groove therein.

In some embodiments, the air intake assembly further includes an optional hose clamp configured for fastening the air filter and the intake tube together. An outer perimeter of the inner annular member of the air filter includes a clamp seat for the optional hose clamp.

Also disclosed herein is an air intake assembly for an internal combustion engine having a reduced part count. The air intake assembly includes, in some embodiments, an air filter configured to remove particulate matter from intake air to produce filtered air, a sealed filter housing configured to house the air filter therein, and an intake tube configured to convey the filtered air to the internal combustion engine. The air filter includes a multi-component coupling interface. The coupling interface is configured to seat an intake-end portion of the intake tube in the coupling interface with at least a clearance engineering fit. The clearance engineering fit obviates a need for any fastening hardware to couple the air filter and the intake tube together, thereby providing at least part of the reduced part count for the air intake assembly. The filter housing includes an aperture and an air intake port configured to provide the intake air to the air filter. The aperture of the filter housing is configured to seat the coupling interface of the air filter in the aperture with at least a clearance engineering fit. The clearance engineering fit obviates a need for any fastening hardware to couple the filter housing and the air filter together, thereby further providing at least part of the reduced part count for the air intake assembly.

In some embodiments, the aperture of the filter housing includes a lip around the aperture defining a filter-housing socket and the coupling interface of the air filter includes an outer annular member defining a coupling-interface spigot. The filter-housing socket is configured to seat the coupling-interface spigot therein.

In some embodiments, the lip around the aperture of the filter housing extends into the filter housing forming an integrated clamp. The integrated clamp is configured to clamp the coupling-interface spigot in the filter-housing socket.

In some embodiments, the coupling interface of the air filter includes an inner annular member defining a coupling-interface socket and the intake-end portion of the intake tube includes an intake-tube spigot. The coupling-interface socket is configured to seat the intake-tube spigot therein.

In some embodiments, the coupling-interface, socket includes a circumferential groove and the intake-tube spigot includes a circumferential protrusion. The circumferential groove is configured to seat the circumferential groove therein.

In some embodiments, the air intake assembly further includes an optional hose clamp configured for fastening the air filter and the intake tube together. An outer perimeter of the inner annular member of the air filter includes a clamp seat for the optional hose clamp.

Also disclosed herein is an air intake assembly for an internal combustion engine including, in some embodiments, an intake tube configured to convey filtered air to the internal combustion engine, an air filter configured to remove particulate matter from intake air to produce the filtered air, a sealed filter housing configured to house the air filter therein, and a coupling mechanism between the air filter and the filter housing for coupling together the air filter and the filter housing. An intake-end portion of the intake tube is configured to insert into a multi-component coupling interface of the air filter. The filter housing includes an air intake port and an aperture. The air intake port of the filter housing is configured to provide the intake air to the air filter. The aperture of the filter housing is configured to accept the coupling interface of the air filter inserted therein. The aperture of the filter housing includes a lip around the aperture defining a filter-housing socket configured to accept insertion of a coupling-interface spigot defined by an outer annular member of the coupling interface of the air filter. The coupling mechanism between the air filter and the filter housing couples together the air filter and the filter housing upon inserting the coupling-interface spigot of the air filter into the filter-housing socket of the filter housing.

In some embodiments, the coupling mechanism between the air filter and the filter housing includes a plurality of clevis pins extending from the filter housing around the filter-housing socket, a corresponding plurality of through holes through an annular shoulder of the coupling-interface spigot, and a corresponding plurality of split pins or retainer clips. Upon coupling together the air filter and the filter housing, the clevis pins extend through the through holes of the annular shoulder of the coupling-interface spigot and the split pins or the retainer clips extend through though holes of the clevis pins.

In some embodiments, the coupling mechanism between the air filter and the filter housing includes a plurality of twist locks around the filter-housing socket and a corresponding plurality of through holes through an annular shoulder of the coupling-interface spigot. Upon coupling together the air filter and the filter housing, a plurality of twist-lock pins of the twist-locks extend through the through holes of the annular shoulder of the coupling-interface spigot and each twist-lock pin of the twist-lock pins is twisted into its locked position.

In some embodiments, the coupling mechanism between the air filter and the filter housing includes a plurality of ball-lock pins, a corresponding plurality of ball-lock-pin receivers in the filter housing around the filter-housing socket, and a corresponding plurality of through holes through an annular shoulder of the coupling-interface spigot. Upon coupling together the air filter and the filter housing, the ball-lock pins extend through the through holes of the annular shoulder of the coupling-interface spigot and into the hall-lock-pin receivers in the filter housing.

In some embodiments, the coupling mechanism between the air titter and the filter housing includes a plurality of buckles disposed on the filter housing around the filter-housing socket and an annular catch integrated into an annular shoulder of the coupling-interface spigot. Upon coupling together the air filter and the filter housing, a plurality of wire-formed hooks of the buckles engage the annular catch of the coupling-interface spigot and each handle of a plurality of handles of the buckles is in its locked position.

Also disclosed herein is an air intake assembly for an internal combustion engine including, in some embodiments, an air filter configured to remove particulate matter from intake air to produce filtered air, a sealed filter housing configured to house the air filter therein, an intake tube configured to convey the filtered air to the internal combustion engine, and a coupling mechanism between the air filter and the intake tube for coupling together the air filter and the intake tube. The filter housing includes an air intake port and an aperture. The air intake port of the filter housing is configured to provide the intake air to the air filter. The aperture of the filter housing is configured to accept a multi-component coupling interface of the air filter inserted therein. An intake-end portion of the intake tube includes an intake-tube spigot configured to insert into a coupling-interface socket defined by an inner annular member of the coupling interface of the air filter. The coupling mechanism between the air filter and the intake tube couples together the air filter and the intake tube upon inserting the intake-tube spigot of the intake tube into the coupling-interface socket of the air filter.

In some embodiments, the coupling mechanism between the air filter and the intake tube includes a circumferential groove in an inner perimeter of the coupling-interface socket and a corresponding circumferential protrusion on the intake-tube spigot. Upon coupling together the air filter and the intake tube, the circumferential protrusion of the intake-tube spigot sits in the circumferential groove of the coupling-interface socket.

In some embodiments, the coupling mechanism between the air filter and the intake tube includes a plurality of directional channels in an inner perimeter of the coupling-interface socket and a corresponding plurality of protrusions on the intake-tube spigot. When coupling together the air filter and the intake tube, the protrusions of the intake-tube spigot advance along the directional channels of the coupling-interface socket.

In some embodiments, the coupling mechanism between the air filter and the intake tube includes continuous internal threads in an inner perimeter of the coupling-interface socket and corresponding continuous external threads on the intake-tube spigot. When coupling together the air filter and the intake tube, the intake-tube spigot screws into the coupling-interface socket by way of the continuous external threads of the intake-tube spigot and the continuous internal threads of the coupling-interface socket.

In some embodiments, the coupling mechanism between the air filter and the intake tube includes non-continuous internal threads in an inner perimeter of the coupling-interface socket and a corresponding plurality of lugs on the intake-tube spigot. When coupling together the air filter and the intake tube, the intake-tube spigot screws into the coupling-interface socket by way of the lugs of the intake-tube spigot and the non-continuous internal threads of the coupling-interface socket.

In some embodiments, the coupling mechanism between the air filter and the intake tube includes a plurality of catch-tipped extension legs extending from the intake-tube spigot configured to extend past an intake end of the coupling-interface socket. Upon coupling together the air filter and the intake tube, the catch-tipped extension legs of the intake-tube spigot catch the intake end of the coupling-interface socket.

Also disclosed herein is an air intake assembly for an internal combustion engine including, in some embodiments, an air filter configured to remove particulate matter from intake air to produce filtered air, a sealed filter housing configured to house the air filter therein, a first coupling mechanism between the air filter and the filter housing for coupling together the air filter and the filter housing, an intake tube configured to convey the filtered air to the internal combustion engine, and a second coupling mechanism between the air filter and the intake tube for coupling together the air filter and the intake tube. The air filter includes a multi-component coupling interface. The filter housing includes an air intake port and an aperture. The air intake port of the filter housing is configured to provide the intake air to the air filter. The aperture of the filter housing is configured to accept the coupling interface of the air filter inserted therein. The first coupling mechanism between the air filter and the filter housing couples together the air filter and the filter housing upon inserting the coupling interface of the air filter into the aperture of the filter housing. An intake-end portion of the intake tube is configured to insert into the coupling interface of the air filter. The second coupling mechanism between the air filter and the intake tube couples together the air filter and the intake tube upon inserting the intake-end portion of the intake tube into the coupling interface of the air filter.

In some embodiments, the aperture of the filter housing includes a lip around the aperture defining a filter-housing socket, and the coupling interface of the air filter includes an outer annular member around the coupling interface defining a coupling-interface spigot. The filter-housing socket of the filter housing is configured to accept insertion of the coupling-interface spigot of the air filter.

In some embodiments, the first coupling mechanism between the air filter and the filter housing includes a plurality of clevis pins extending from the filter housing around the filter-housing socket, a corresponding plurality of through holes through an annular shoulder of the coupling-interface spigot, and a corresponding plurality of split pins or retainer clips. Upon coupling together the air filter and the filter housing, the clevis pins extend through the through holes of the annular shoulder of the coupling-interface spigot and the split pins or the retainer clips extend through though holes of the clevis pins.

In some embodiments, the first coupling mechanism between the air filter and the filter housing includes a plurality of twist locks around the filter-housing socket and a corresponding plurality of through holes through an annular shoulder of the coupling-interface spigot. Upon coupling together the air filter and the filter housing, a plurality of twist-lock pins of the twist-locks extend through the through holes of the annular shoulder of the coupling-interface spigot and each twist-lock pin of the twist-lock pins is twisted into its locked position.

In some embodiments, the first coupling mechanism between the air filter and the filter housing includes a plurality of hall-lock pins, a corresponding plurality of ball-lock-pin receivers in the filter housing around the filter-housing socket, and a corresponding plurality of through holes through an annular shoulder of the coupling-interface spigot. Upon coupling together the air filter and the filter housing, the ball-lock pins extend through the through holes of the annular shoulder of the coupling-interface spigot and into the ball-lock-pin receivers in the filter housing.

In some embodiments, the first coupling mechanism between the air filter and the filter housing includes a plurality of buckles disposed on the filter housing around the filter-housing socket and an annular catch integrated into an annular shoulder of the coupling-interface spigot. Upon coupling together the air filter and the filter housing, a plurality of wire-formed hooks of the buckles engage the annular catch of the coupling-interface spigot and each handle of a plurality of handles of the buckles is in its locked position.

In some embodiments, the coupling interface of the air filter includes an inner annular member defining a coupling-interface socket, and the intake-end portion of the intake tube includes an intake-tube spigot. The coupling-interface socket of the air filter is configured to accept insertion of the intake-tube spigot of the intake tube.

In some embodiments, the second coupling mechanism between the air filter and the intake tube includes a circumferential groove in an inner perimeter of the coupling-interface socket and a corresponding circumferential protrusion on the intake-tube spigot. Upon coupling together the air filter and the intake tube, the circumferential protrusion of the intake-tube spigot sits in the circumferential groove of the coupling-interface socket.

In some embodiments, the second coupling mechanism between the air filter and the intake tube includes a plurality of directional channels in an inner perimeter of the coupling-interface socket and a corresponding plurality of protrusions on the intake-tube spigot. When coupling together the air filter and the intake tube, the protrusions of the intake-tube spigot advance along the directional channels of the coupling-interface socket.

In some embodiments, the second coupling mechanism between the air filter and the intake tube includes continuous internal threads in an inner perimeter of the coupling-interface socket and corresponding continuous external threads on the intake-tube spigot. When coupling together the air filter and the intake tube, the intake-tube spigot screws into the coupling-interface socket by way of the continuous external threads of the intake-tube spigot and the continuous internal threads of the coupling-interface socket.

In some embodiments, the second coupling mechanism between the air filter and the intake tube includes non-continuous internal threads in an inner perimeter of the coupling-interface socket and a corresponding plurality of lugs on the intake-tube spigot. When coupling together the air filter and the intake tube, the intake-tube spigot screws into the coupling-interface socket by way of the lugs of the intake-tube spigot and the non-continuous internal threads of the coupling-interface socket.

In some embodiments, the second coupling mechanism between the air filter and the intake tube includes a plurality of catch-tipped extension legs extending from the intake-tube spigot configured to extend past an intake end of the coupling-interface socket. Upon coupling together the air filter and the intake tube, the catch-tipped extension legs of the intake-tube spigot catch the intake end of the coupling-interface socket.

Also disclosed herein is an air intake assembly for an internal combustion engine including, in some embodiments, an air filter configured to remove particulate matter from intake air to produce filtered air, a sealed filter housing configured to house the air filter therein, an intake tube configured to convey the filtered air to the internal combustion engine, and a service-determination enabling means for enabling a person to determine whether or not the air filter should be serviced. The filter housing includes an aperture and an air intake port configured to provide the intake air to the air filter. The aperture of the filter housing is configured to accept a multi-component coupling interface of the air filter inserted in the aperture. The coupling interface of the air filter is configured to accept an intake-end portion of the intake tube inserted in the coupling interface.

In some embodiments, the service-determination enabling means includes a window disposed in or over a window opening in a side or a top of the filter housing.

In some embodiments, the service-determination enabling means includes at least a pair of windows and at least a pair of corresponding window openings. A first window of the pair of windows is removably disposed in or over a first window opening of the pair of window openings in a side of the filter housing. A second window of the pair of windows is fixedly disposed in or over a second window opening of the pair of window openings in a top of the filter housing.

In some embodiments, the first window opening doubles as an auxiliary air scoop configured to provide additional intake air to the air filter when the first window is removed from the first window opening.

In some embodiments, the service-determination enabling means includes a transparent top or side of the filter housing.

In some embodiments, the service-determination enabling means includes an airflow-monitor port in the intake tube.

In some embodiments, the service-determination enabling means includes a mechanical airflow monitor disposed in the airflow-monitor port.

Also disclosed herein is an air intake assembly for an internal combustion engine including, in some embodiments, an air filter configured to remove particulate matter from intake air to produce filtered air, a sealed filter housing configured to house the air filter therein, and an intake tube configured to convey the filtered air from an intake-end opening of the intake tube to the internal combustion engine by way of an output-end opening of the intake tube. The filter housing includes an aperture and an air intake port configured to provide the intake air to the air filter. The aperture of the filter housing is configured to accept a multi-component coupling interface of the air filter inserted in the aperture. The coupling interface of the air filter is configured to accept an intake-end portion of the intake tube inserted in the coupling interface. The intake tube includes one or more additional openings exclusive of the intake-end and output-end openings of the intake tube respectively configured for determining one or more aspects of the filtered air or an airflow thereof.

In some embodiments, a first opening of the one or more additional openings is configured as an airflow-monitor port in the intake tube.

In some embodiments, the air intake assembly further includes a rubber grommet lining the airflow-monitor port and a plug removably disposed in the airflow-monitor port.

In some embodiments, a second opening of the one or more additional openings is configured as a mass-airflow-sensor port in the intake tube.

In some embodiments, a third opening of the one or more additional openings is configured as a humidity-sensor port in the intake tube.

In some embodiments, the air intake assembly further includes a gasket lining the humidity-sensor port and a cover removably disposed over the humidity-sensor port.

In some embodiments, a first opening of the one or more additional openings is configured as an airflow-monitor port in the intake tube and a second opening of the one or more additional openings is configured as a mass-airflow-sensor port in the intake tube.

In some embodiments, the air intake assembly further includes a rubber grommet lining the airflow-monitor port and a plug removably disposed in the airflow-monitor port.

In some embodiments, a first opening of the one or more additional openings is configured as an airflow-monitor port in the intake tube, a second opening of the one or more additional openings is configured as a mass-airflow-sensor port in the intake tube, and a third opening of the one or more additional openings is configured as a humidity-sensor port in the intake tube.

In some embodiments, the air intake assembly further includes a rubber grommet lining the airflow-monitor port, a plug removably disposed in the airflow-monitor port, a gasket lining the humidity-sensor port, and a cover removably disposed over the humidity-sensor port.

Also disclosed herein is an air intake assembly for an internal combustion engine including, in some embodiments, an air filter configured to remove particulate matter from intake air to produce filtered air, a sealed filter housing configured to house the air filter therein, and an intake tube configured to convey the filtered air from an intake-end opening of the intake tube to the internal combustion engine by way of an output-end opening of the intake tube. The air filter includes a multi-component coupling interface. The filter housing includes an aperture, an air intake port configured to provide the intake air to the air filter, and one or more windows. The aperture of the filter housing is configured to accept the coupling interface of the air filter inserted in the aperture. The one or more windows of the filter housing are optionally disposed in or over one or more corresponding window openings in a side or a top of the filter housing. The one or more windows or window openings are configured for enabling a person to determine whether or not the air filter should be serviced. The coupling interface of the air filter is configured to accept an intake-end portion of the intake tube inserted in the coupling interface. The intake tube includes one or more additional openings exclusive of the intake-end and output-end openings of the intake tube respectively configured for determining one or more aspects of the filtered air or an airflow thereof.

In some embodiments, the one or more windows includes at least a pair of windows and the one or more corresponding window openings includes at least a pair of corresponding window openings. A first window of the pair of windows is removably disposed in or over a first window opening of the pair of window openings in a side of the filter housing. A second window of the pair of windows is fixedly disposed in or over a second window opening of the pair of window openings in a top of the filter housing.

In some embodiments, the first window opening doubles as an auxiliary air scoop configured to provide additional intake air to the air filter when the first window is removed from the first window opening.

In some embodiments, a first opening of the one or more additional openings is configured as an airflow-monitor port in the intake tube.

In some embodiments, the air intake assembly further includes a rubber grommet lining the airflow-monitor port and a plug removably disposed in the airflow-monitor port. The plug is configured for use when a mechanical airflow monitor is not in use for determining restriction of the airflow of the filtered air.

In some embodiments, a second opening of the one or more additional openings is configured as a mass-airflow-sensor port in the intake tube.

In some embodiments, a third opening of the one or more additional openings is configured as a humidity-sensor port in the intake tube.

In some embodiments, the air intake assembly further includes a gasket lining the humidity-sensor port and a cover removably disposed over the humidity-sensor port. The cover is configured for use when a humidity sensor is not in use for determining humidity of the of the filtered air.

In some embodiments, a first window of the one or more windows is removably disposed in or over a first window opening of the one or more window openings in a side of the filter housing, a first opening of the one or more additional openings is configured as an airflow-monitor port in the intake tube, and a second opening of the one or more additional openings is configured as a mass-airflow-sensor port in the intake tube.

In some embodiments, the first window opening doubles as an auxiliary air scoop configured to provide additional intake air to the air filter when the first window is removed from the first window opening. In addition, the air intake assembly further includes a rubber grommet lining the airflow-monitor port and a plug removably disposed in the airflow-monitor port.

In some embodiments, a first window of the one or more windows is removably disposed in or over a first window opening of the one or more window openings in a side of the filter housing, a first opening of the one or more additional openings is configured as an airflow-monitor port in the intake tube, a second opening of the one or more additional openings is configured as a mass-airflow-sensor port in the intake tube, and a third opening of the one or more additional openings is configured as a humidity-sensor port in the intake tube.

In some embodiments, the first window opening doubles as an auxiliary air scoop configured to provide additional intake air to the air filter when the first window is removed from the first window opening. In addition, the air intake assembly further includes a rubber grommet lining the airflow-monitor port, a plug removably disposed in the airflow-monitor port, a gasket lining the humidity-sensor port, and a cover removably disposed over the humidity-sensor port.

Also disclosed herein is a method of making an air intake assembly for an internal combustion engine. The method includes, in some embodiments, molding end pieces for an air filter, wherein at least one end piece of the end pieces includes a multi-component coupling interface for the air filter; coupling the end pieces to filter media to form the air filter; molding a sealed filter housing configured to house the air filter therein, wherein the filter housing includes an aperture and an air intake port configured to provide intake air to the air filter for producing filtered air by removing particulate matter from the intake air; and molding an intake tube configured to convey the filtered air from the air filter to the internal combustion engine. The coupling interface of the air filter is configured to accept an intake-end portion of the intake tube in the coupling interface. The aperture of the filter housing is configured to accept the coupling interface of the air filter in the aperture.

In some embodiments, molding the end pieces of the air filter includes molding an inner annular member and an outer annular member of the coupling interface. The inner annular member of the coupling interface defines a coupling-interface socket. The outer annular member of the coupling interface defines a coupling-interface spigot.

In some embodiments, molding the end pieces of the air filter includes molding a, shared annular shoulder between intake-end portions of the inner annular member and the outer annular member of the coupling interface.

In some embodiments, molding the intake tube includes molding an intake-tube spigot in the intake-end portion of the intake tube. The intake-tube spigot is configured to sit in the coupling-interface socket with at least a clearance engineering fit.

In some embodiments, molding the intake tube includes molding the intake-tube spigot with a circumferential protrusion. In addition, molding the end pieces of the air filter includes molding the coupling-interface socket with a circumferential groove. The circumferential groove of the coupling-interface socket is configured to seat therein the circumferential protrusion of the intake-tube spigot with at least a clearance engineering fit.

In some embodiments, molding the intake tube includes molding the intake-tube spigot with a smaller outer diameter than a remainder of the intake-end portion of the intake tube. The remainder of the intake-end portion of the intake tube is molded with a larger outer diameter providing a shouldered stop configured to prevent over-insertion of the intake-tube spigot into the coupling-interface socket.

In some embodiments, molding the filter housing includes molding a lip around the aperture of the filter housing. The lip around the aperture defines a filter-housing socket configured to seat therein the coupling-interface spigot with at least a clearance engineering fit.

In some embodiments, molding the filter housing includes molding the lip around the aperture with a pair of opposing annular shoulders. The pair of opposing annular shoulders defines a clamp seat over the filter-housing socket.

In some embodiments, molding the filter housing includes molding the lip around the aperture with one or more transverse slits dividing the lip into one or more respective deformable lip pieces. The one or more deformable pieces are configured to deform toward a central axis of the filter-housing socket when a clamp in the clamp seat is tightened.

In some embodiments, molding the end pieces of the air filter includes molding an annular shoulder of the coupling-interface spigot as a stop configured to prevent over-insertion of the coupling-interface spigot into the filter-housing socket.

In some embodiments, the method further includes cutting a length of hose to produce a hump coupler. The hump coupler is configured for coupling an output-end portion of the intake tube to an intake-end portion of an engine intake or a component thereof.

In some embodiments, the method further includes packaging the air filter, the filter housing, the intake tube, the hump coupler, and at least two clamps in a suitably sized package with optional package inserts for shipping, retail sale, or both shipping and retail sale.

In some embodiments, molding at least the filter housing and the intake tube is in accordance with space available in engine compartments of different makes and models of motor vehicles.

Also disclosed herein is a method of installing an air intake assembly for an internal combustion engine in an engine compartment of a motor vehicle. The method includes, in some embodiments, obtaining an air filter of the air intake assembly, wherein the air filter includes a multi-component coupling interface; inserting the air filter into an aperture of a filter housing of the air intake assembly by way of the coupling interface of the air filter; placing the filter housing including the air filter in the engine compartment in place of another air intake assembly; and inserting an intake-end portion of an intake tube of the air intake assembly into the coupling interface of the air filter.

In some embodiments, inserting the air filter into the aperture of the filter housing includes inserting a coupling-interface spigot of the air filter into a filter-housing socket of the filter-housing. The coupling-interface spigot is defined by an outer annular member of the coupling interface of the air filter. The filter-housing socket is defined by a lip around the aperture of the filter-housing.

In some embodiments, inserting the intake-end portion of the intake tube into the coupling interface of the air filter includes inserting an intake-tube spigot of the intake tube into a coupling-interface socket of the air filter. The coupling-interface socket is defined by an inner annular member of the coupling interface of the air filter.

In some embodiments, the method further includes coupling an output-end portion of the intake tube to an intake of the internal combustion engine with a hump coupler between the intake tube and the internal combustion engine; securing the hump coupler by tightening a first 'T'-bolt clamp over the hump coupler at the output-end portion of the intake tube; and securing the hump coupler by tightening a second 'T'-bolt clamp over the hump coupler at the intake of the internal combustion engine.

In some embodiments, the method further includes placing a mass-airflow sensor in or over a mass-airflow-sensor port in the intake tube; and securing the mass-airflow sensor in or over the mass-airflow-sensor port with a pair of screws.

In some embodiments, the method further includes lining an airflow-monitor port in the intake tube with a rubber grommet; and inserting an airflow monitor in the airflow-monitor port lined with the rubber grommet.

Also disclosed herein is a method of installing an air intake assembly for an internal combustion engine in an engine compartment of a motor vehicle. The method includes, in some embodiments, obtaining an air filter of the air intake assembly, wherein the air filter includes a multi-component coupling interface; inserting the air filter into an aperture of a filter housing of the air intake assembly by way of the coupling interface of the air filter; placing the filter housing including the air filter in the engine compartment in place of another air intake assembly; and inserting an intake-end portion of an intake tube of the air intake assembly into the coupling interface of the air filter. Inserting the air filter into the aperture of the filter housing includes inserting a coupling-interface spigot of the air filter into a filter-housing socket of the filter-housing. The coupling-interface spigot is defined by an outer annular member of the coupling interface of the air filter. The filter-housing socket is defined by a lip around the aperture of, the filter-housing. Inserting the intake-end portion of the intake tube into the coupling interface of the air filter includes inserting an intake-tube spigot of the intake tube into a coupling-interface socket of the air filter. The coupling-interface socket is defined by an inner annular member of the coupling interface of the air filter.

These and other features of the concepts provided herein will become more apparent to those of skill in the art in view of the accompanying drawings and following description, which disclose particular embodiments of such concepts in greater detail.

DRAWINGS

FIG. 3 illustrates a second air intake assembly in accordance with some embodiments.

Figure 4:
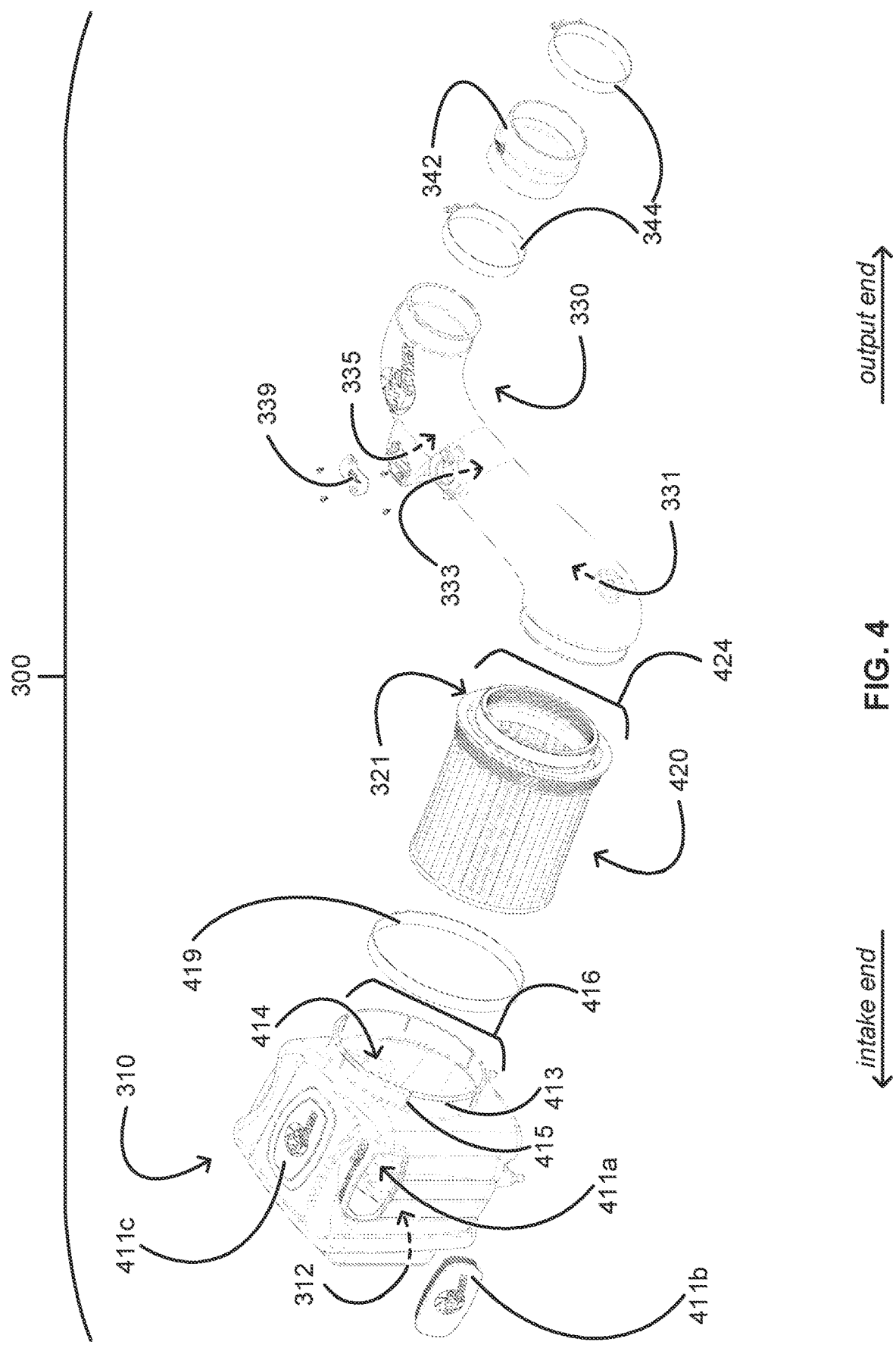

FIG. 4 provides an exploded view of the second air intake assembly in accordance with some embodiments.

Figure 5:
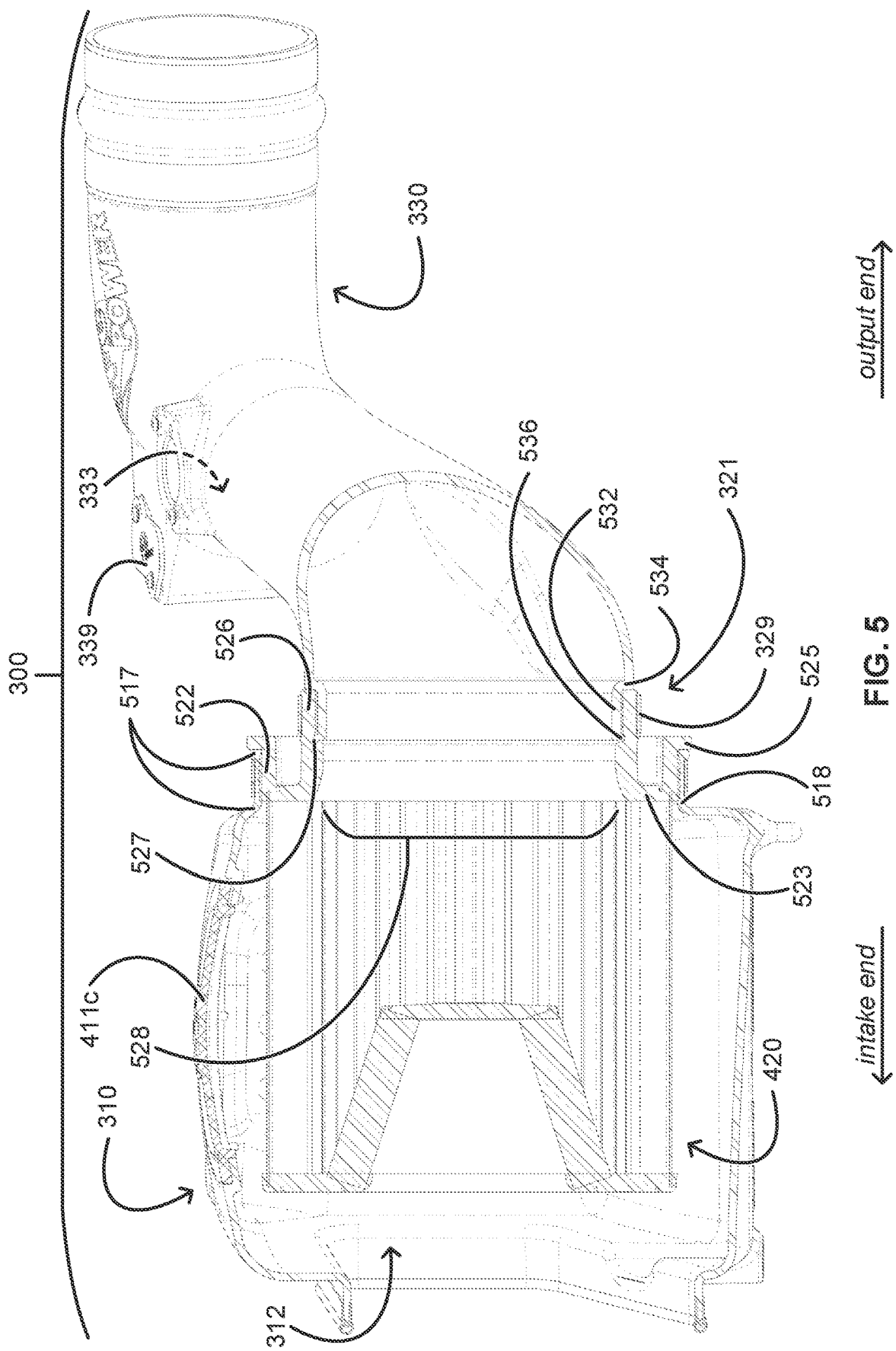

FIG. 5 provides a cross-sectional view of the second air intake assembly in accordance with some embodiments.

Figure 6:
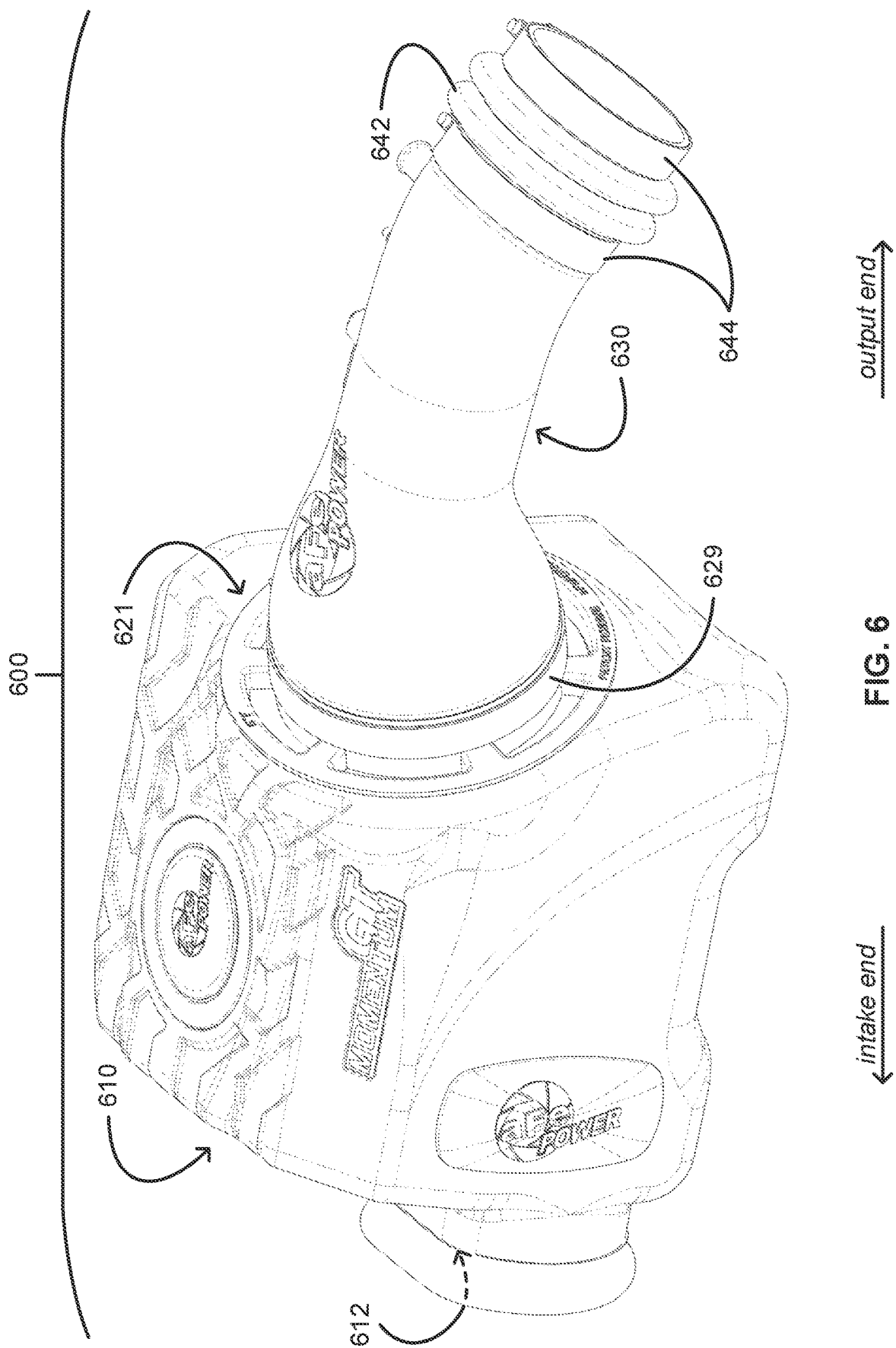

FIG. 6 illustrates a third air intake assembly in accordance with some embodiments.

Figure 7:
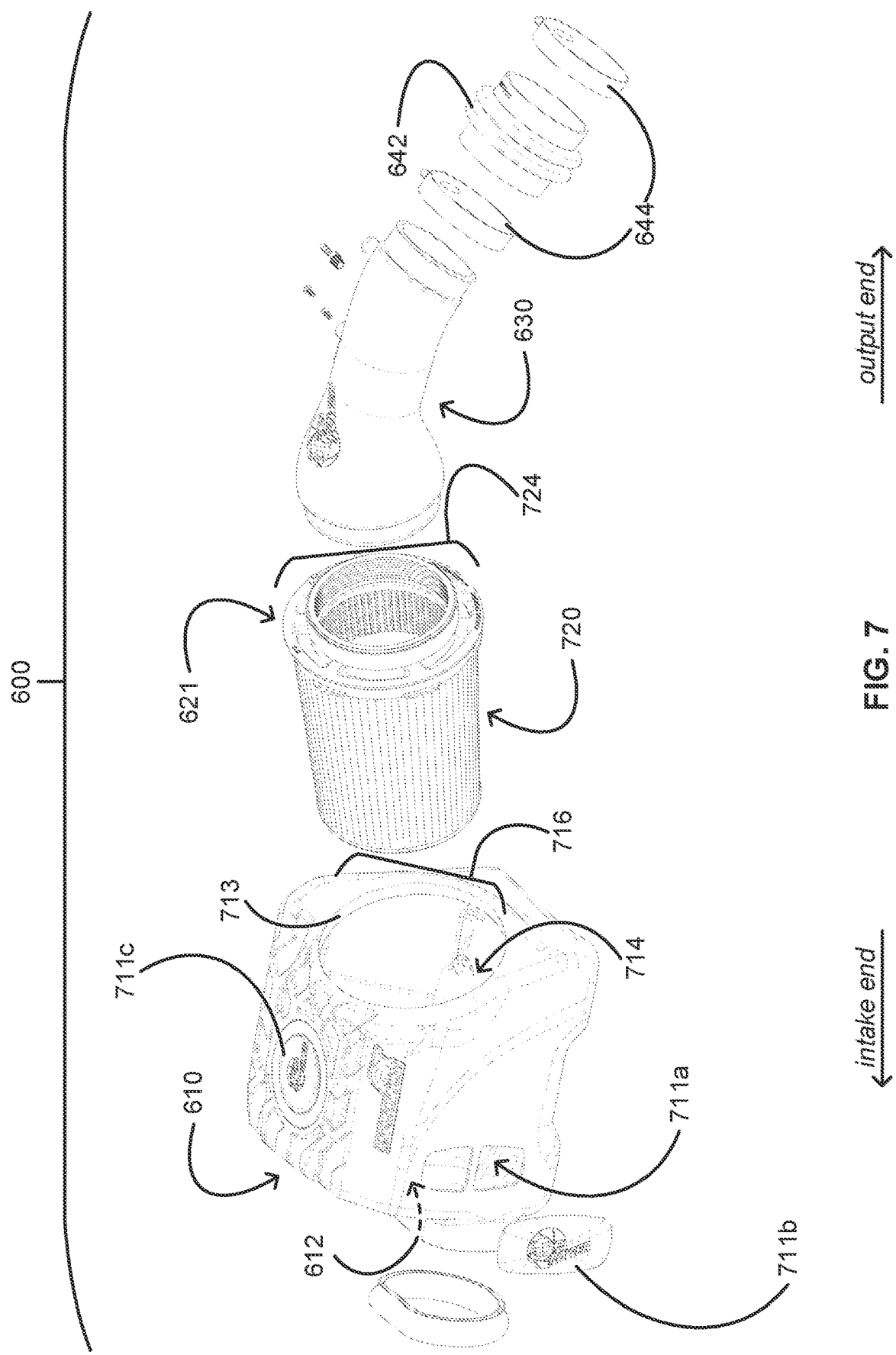

FIG. 7 provides an exploded view of the third air intake assembly in accordance with some embodiments.

Figure 8:
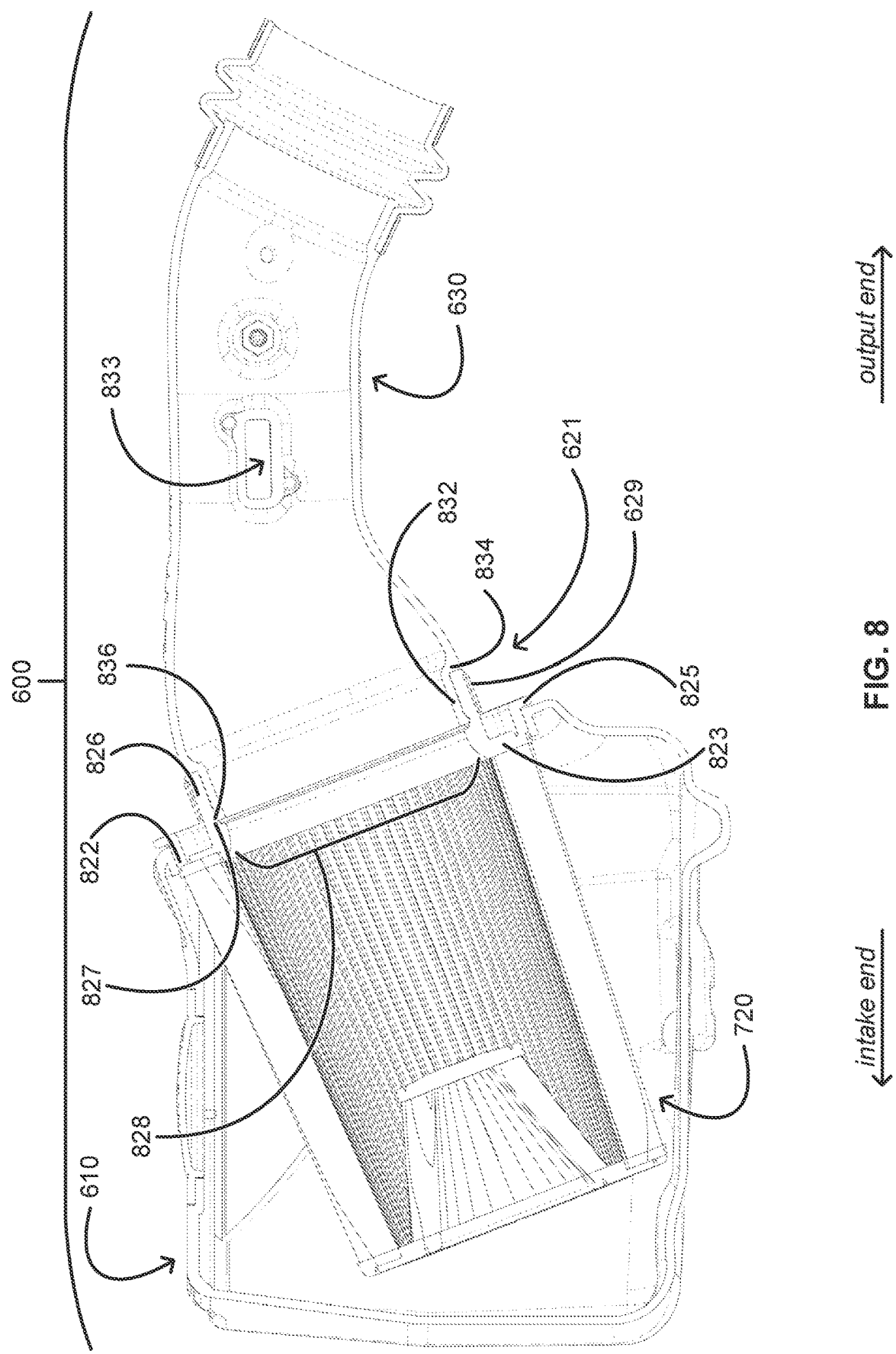

FIG. 8 provides a cross-sectional view of the third air intake assembly in accordance with some embodiments.

FIG. 9 illustrates a coupling mechanism between an air filter and an intake tube for coupling together the air filter and the intake tube in accordance with some embodiment.

FIG. 10 illustrates a coupling mechanism between an air filter and an intake tube for coupling together the air filter and the intake tube in accordance with some embodiments.

Figure 11:
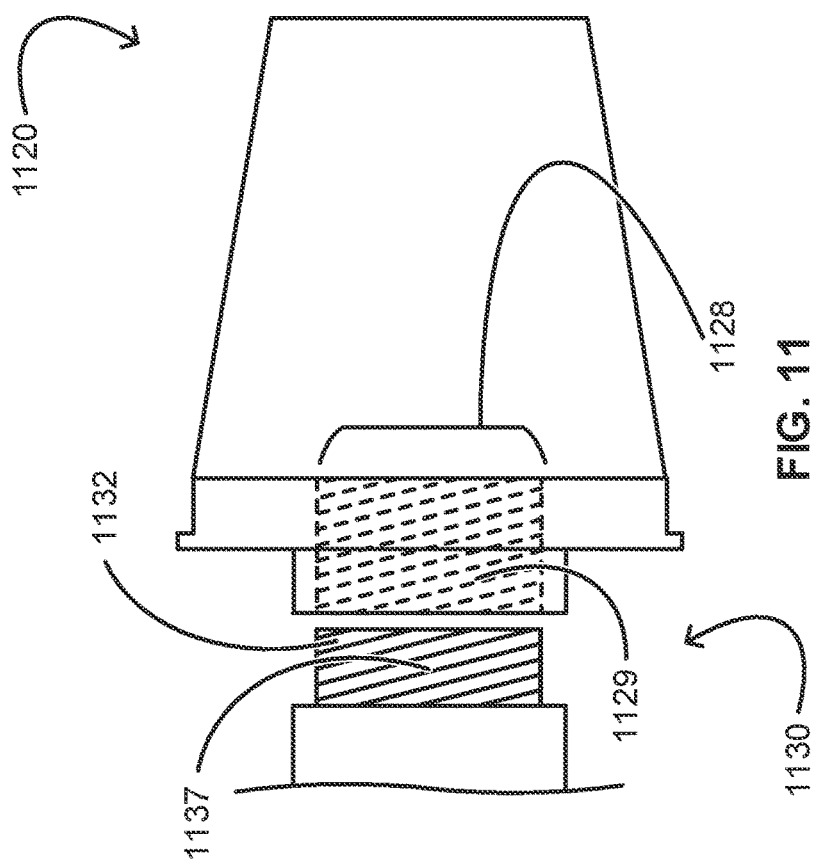

FIG. 11 illustrates a coupling mechanism between an air filter and an intake tube for coupling together the air filter and the intake tube in accordance with some embodiments.

Figure 12:
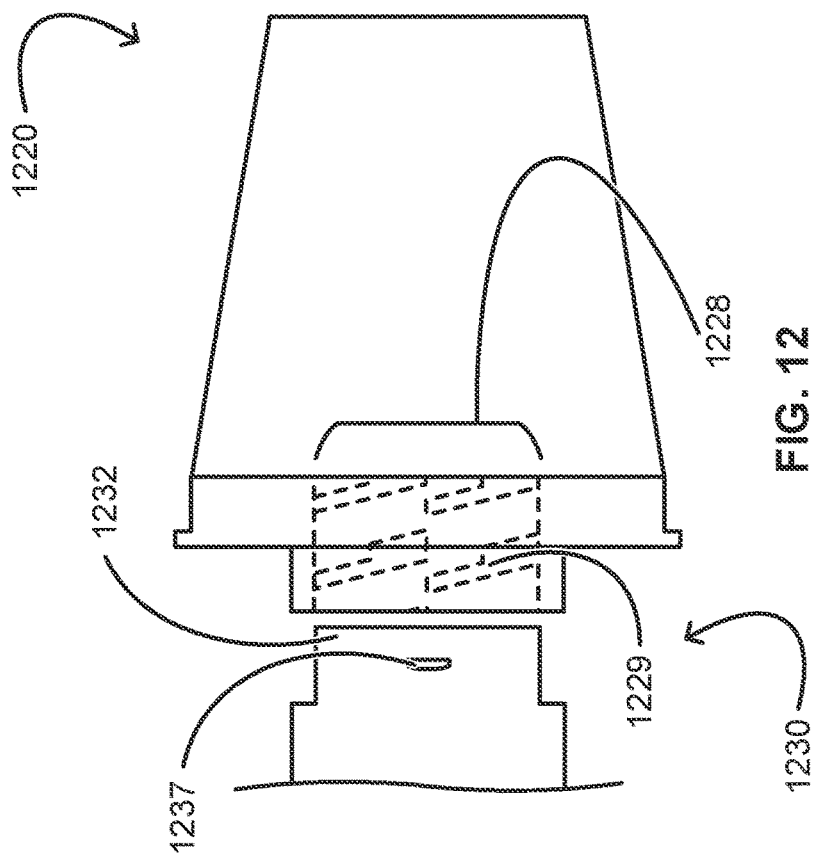

FIG. 12 illustrates a coupling mechanism between an air filter and an intake tube for coupling together the air filter and the intake tube in accordance with some embodiments.

Figure 13:
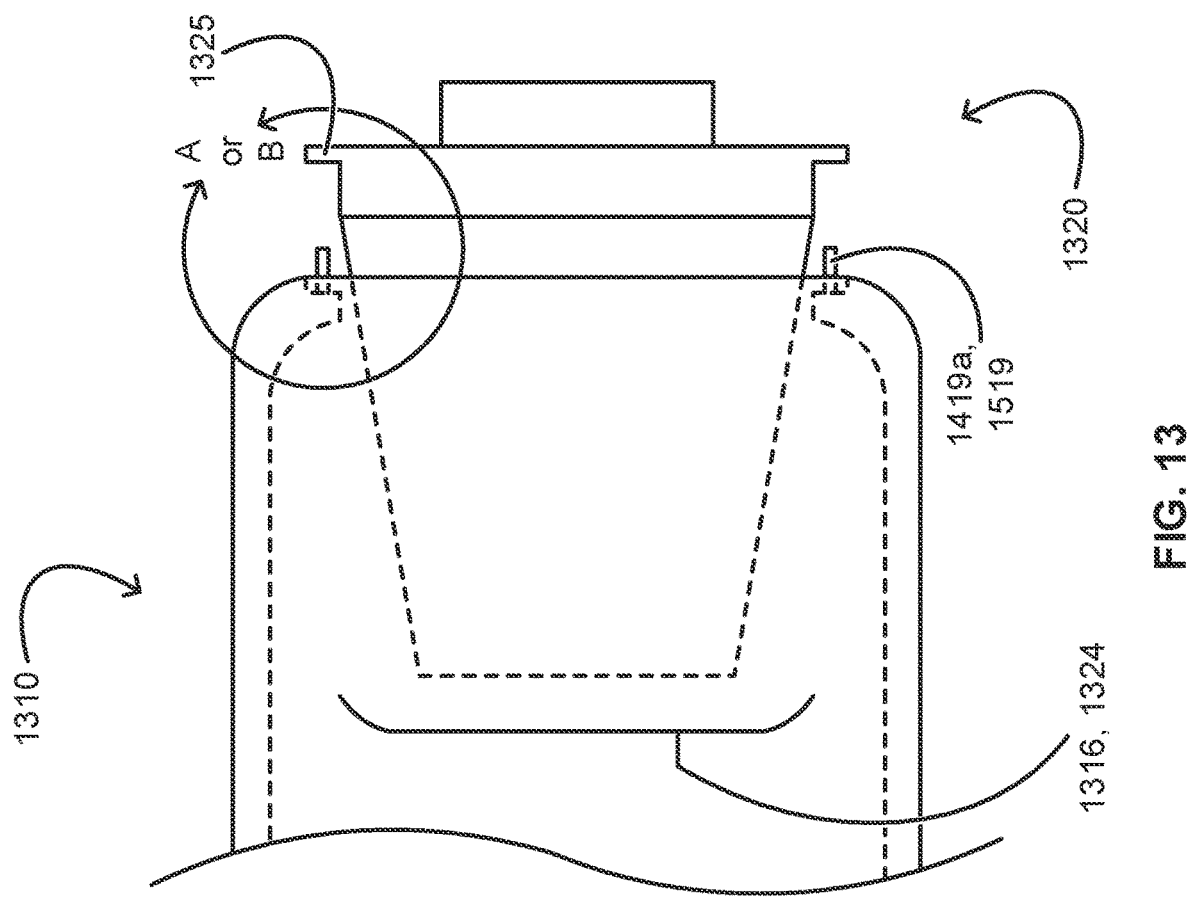

FIG. 13 illustrates two coupling mechanisms between an air filter and a filter housing for coupling together the air filter and the filter housing in accordance with some embodiments.

Figure 14:
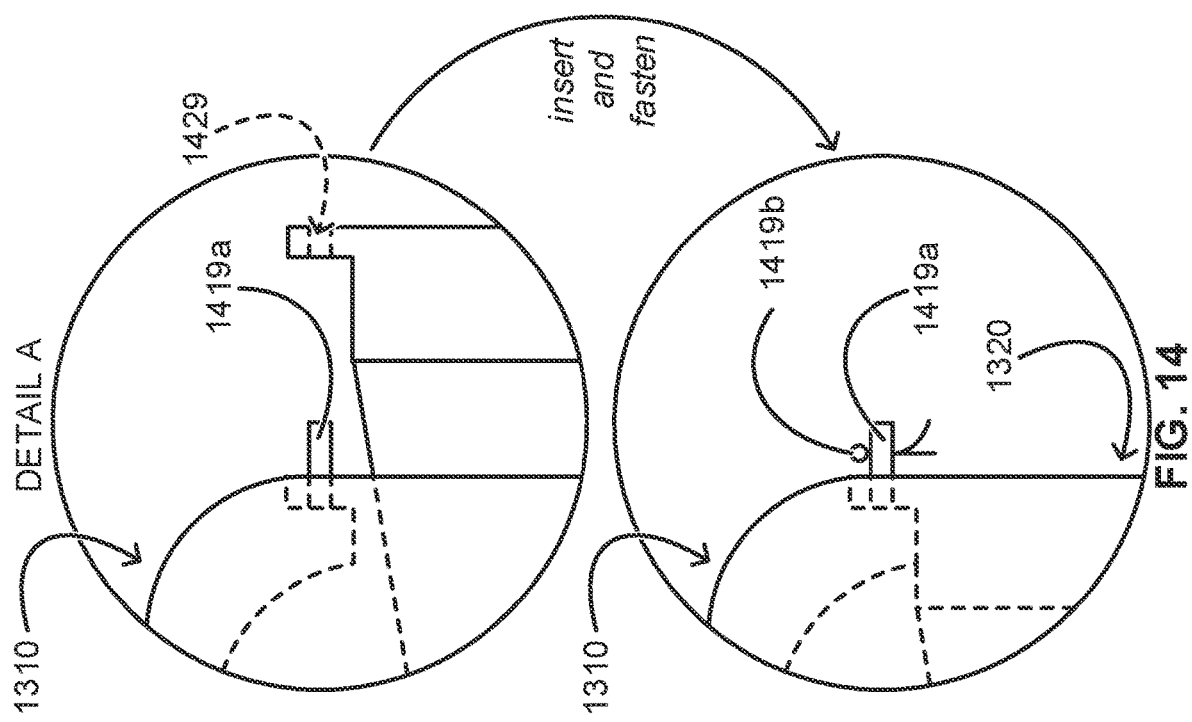

FIG. 14 illustrates in detail one of the two coupling mechanisms of FIG. 13 in accordance with some embodiments.

Figure 15:
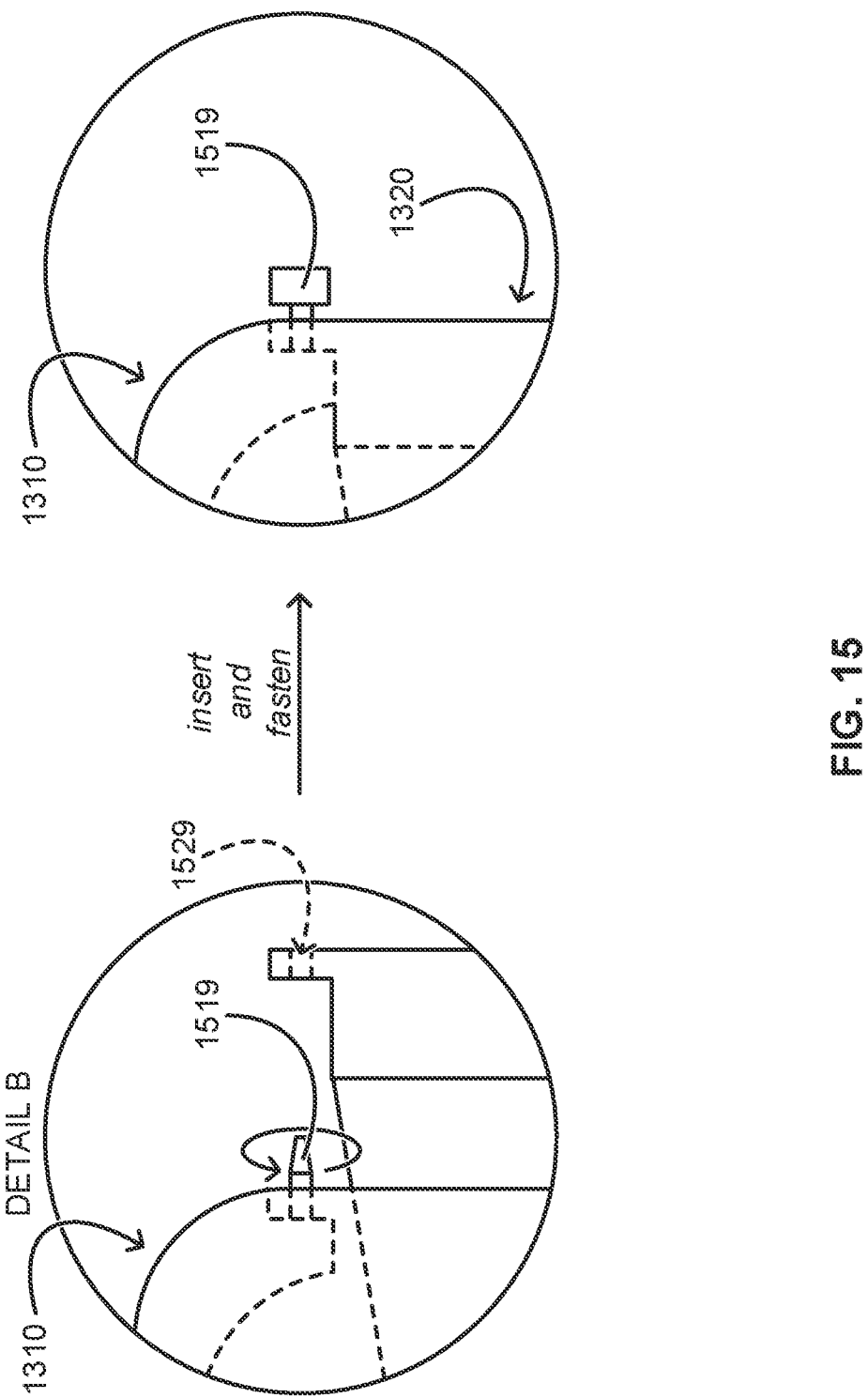

FIG. 15 illustrates in detail another one of the two coupling mechanisms of FIG. 13 in accordance with some embodiments.

Figure 16:
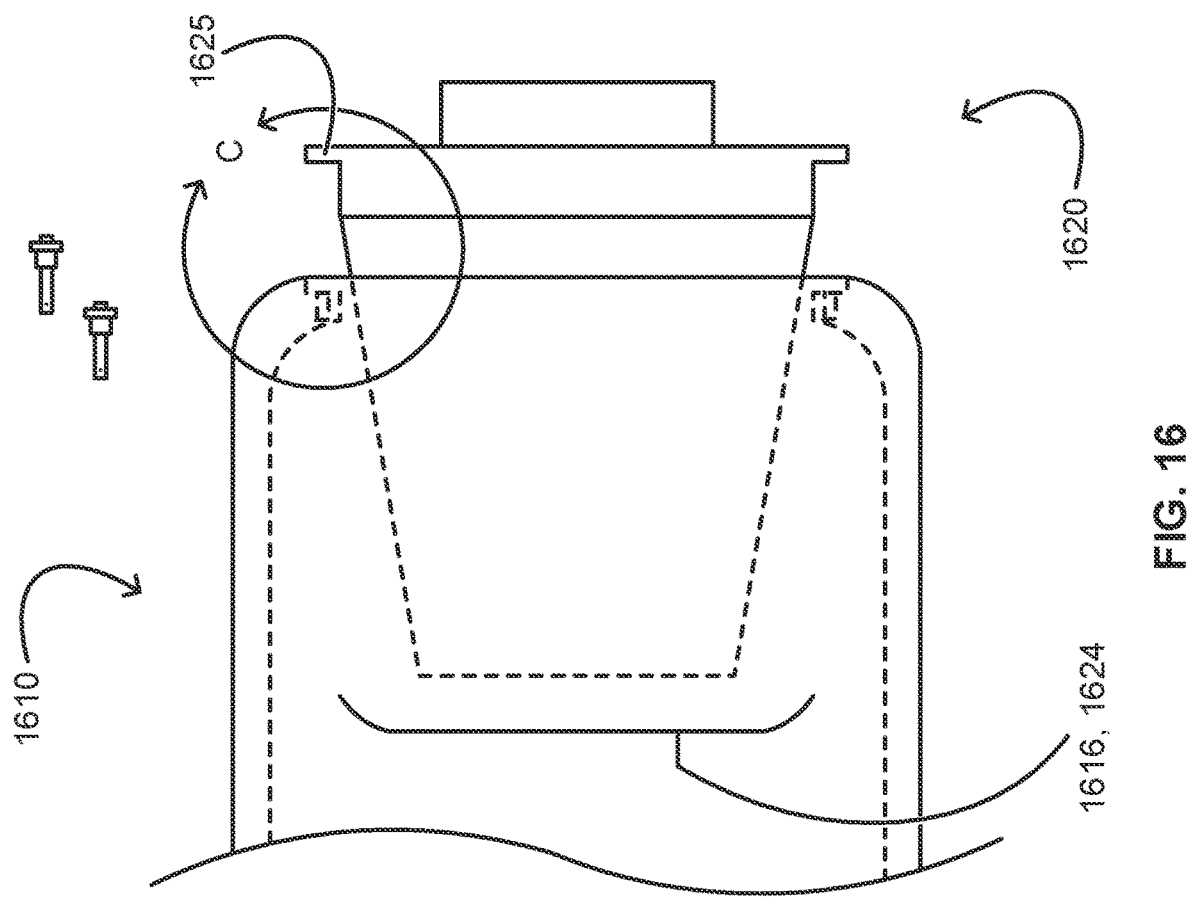

FIG. 16 illustrates a coupling mechanism between an air filter and a filter housing for coupling together the air filter and the filter housing in accordance with some embodiments.

Figure 17:
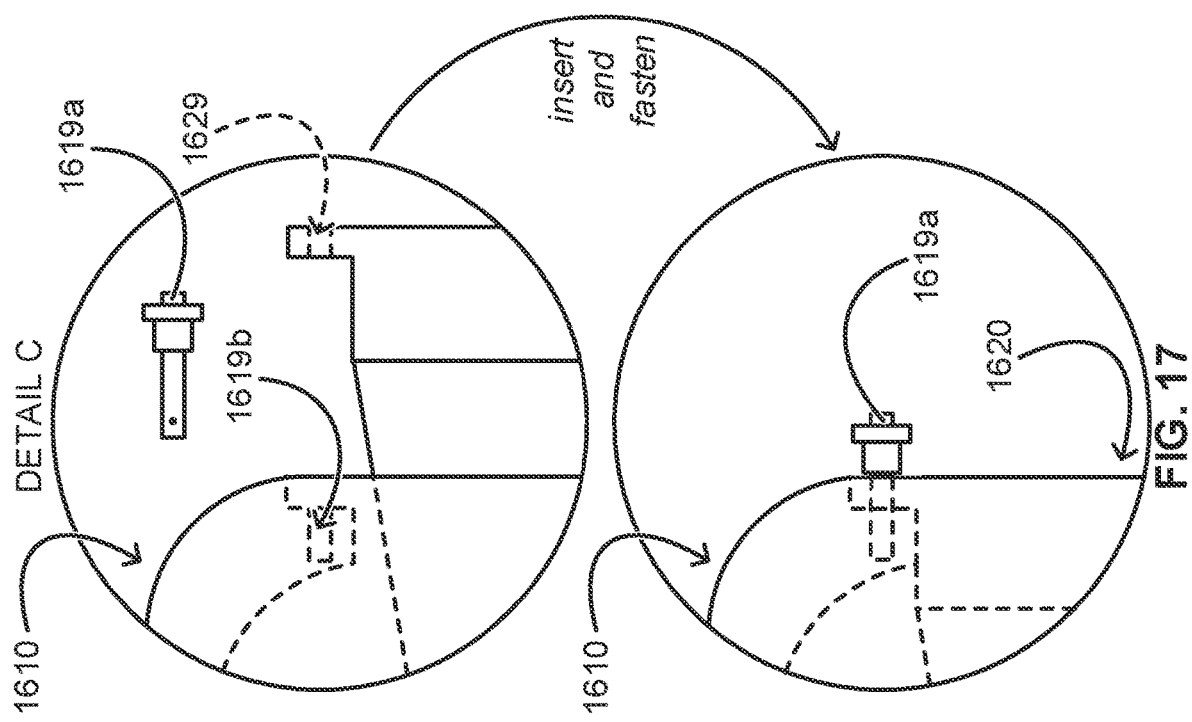

FIG. 17 illustrates in detail the coupling mechanism of FIG. 16 in accordance with some embodiments.

FIG. 18 illustrates a coupling mechanism between an air filter and a filter housing for coupling together the air filter and the filter housing in accordance with some embodiments.

Figure 19:
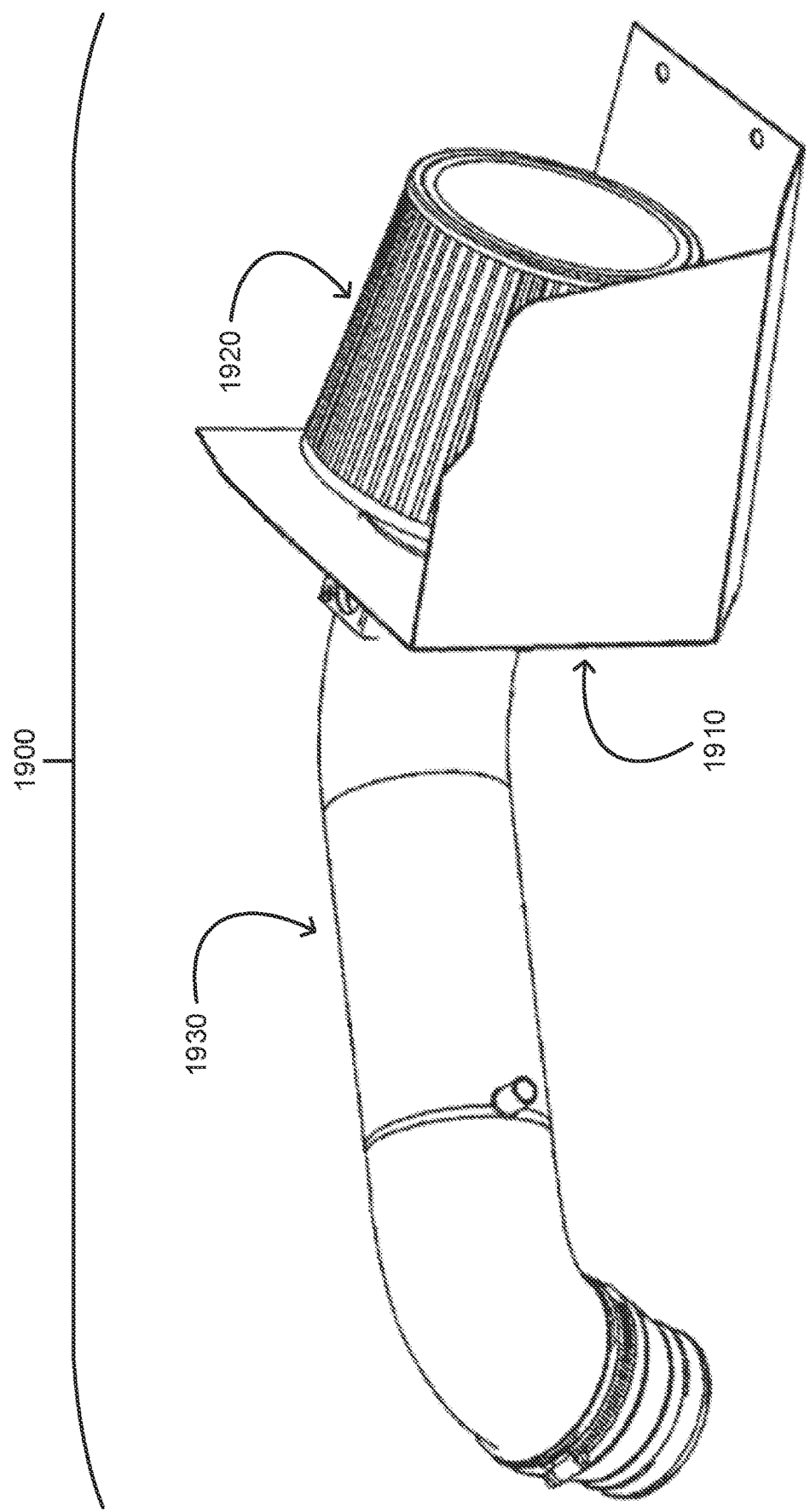

FIG. 19 illustrates an air intake assembly with a first type of open-element filter housing configured to separate intake air from other air in an engine compartment.

Figure 20:
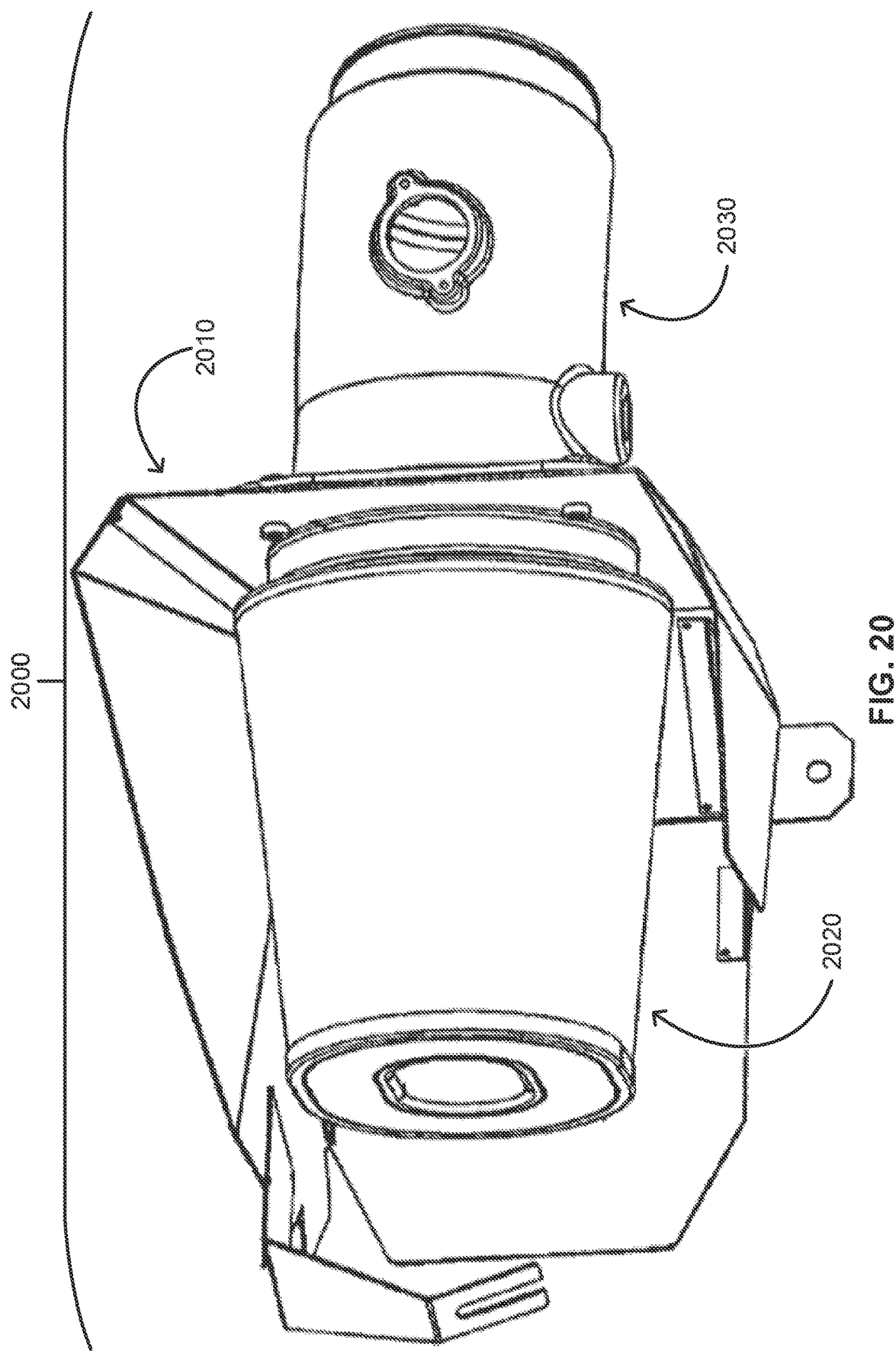

FIG. 20 illustrates an air intake assembly with a second type of open-element filter housing configured to separate intake air from other air in an engine compartment.

Figure 21:
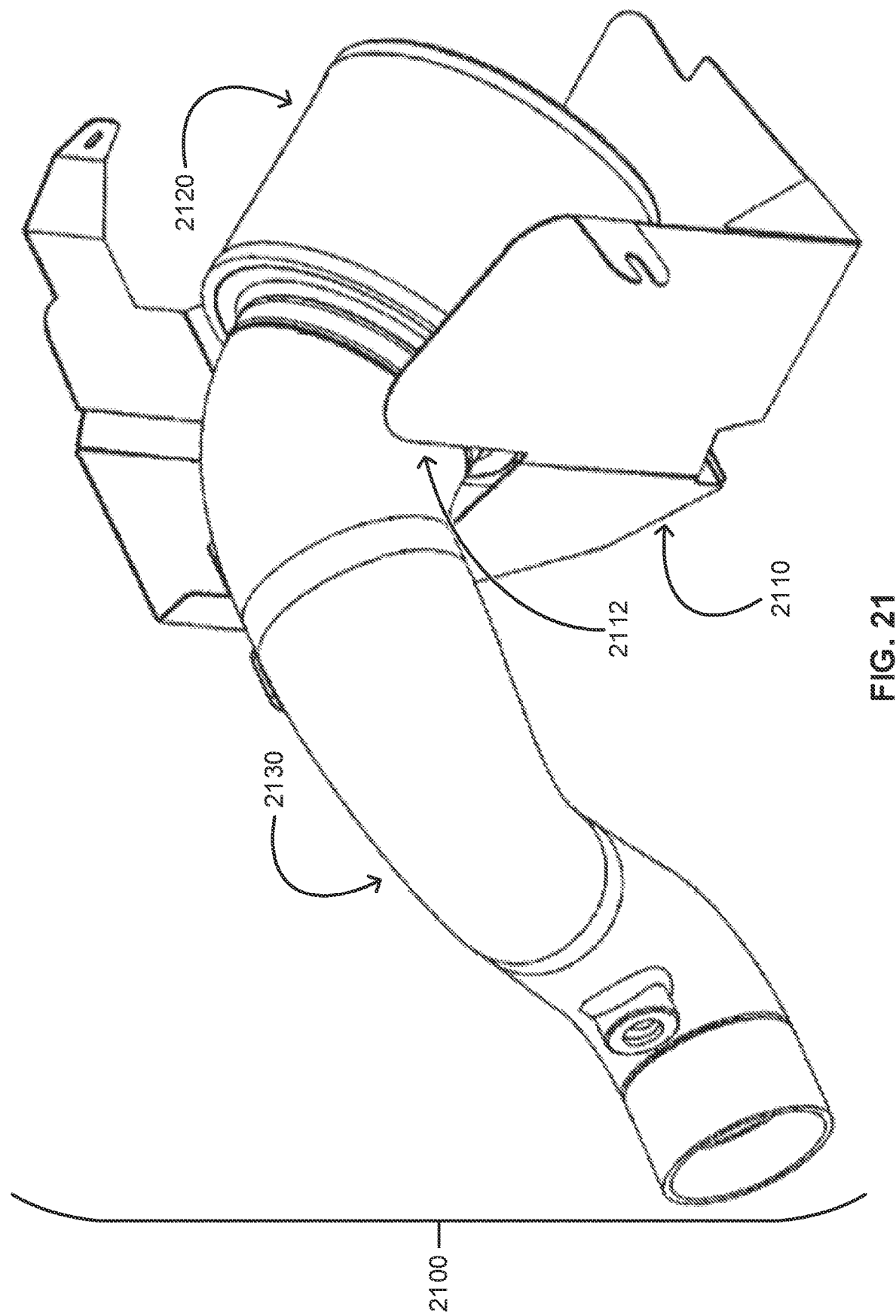

FIG. 21 illustrates an air intake assembly with a third type of open-element filter housing configured to separate intake air from other air in an engine compartment.

Figure 22:
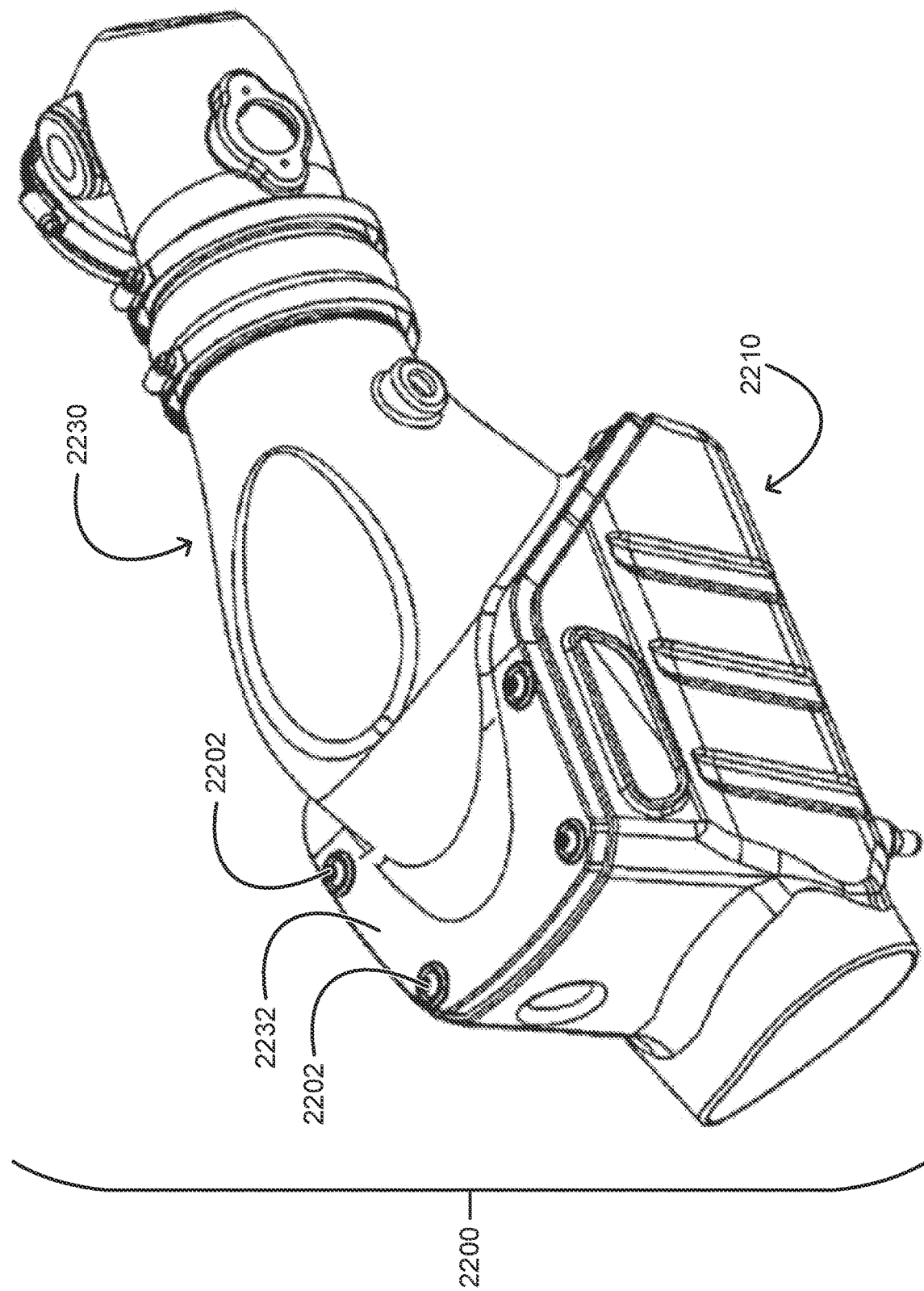

FIG. 22 illustrates an air intake assembly with a sealed filter housing configured to separate intake air from other air in an engine compartment.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or direction. Singular forms of "a," "an," and "the" include plural references unless the context clearly dictates otherwise.

With respect to an "intake portion" or "intake-end portion" of an air intake assembly or a component thereof (e.g., an intake tube), such a portion is intended to be near an intake of the air intake assembly or the component in accordance with use of the air intake assembly or the component as disclosed herein. An "intake end" of the air intake assembly or the component thereof includes an end near the intake of the air intake assembly or the component. The intake portion or the intake-end portion of the air intake assembly or the component thereof can include the intake end of the air intake assembly or the component, respectively; however, the intake portion or the intake-end portion of the air intake assembly or the component thereof need not include the intake end of the air intake assembly or the component, respectively. That is, unless context suggests otherwise, the intake portion or the intake-end portion of the air intake assembly or the component thereof is not a terminal portion of the air intake assembly or the component.

With respect to an "output portion" or "output-end portion" of an air intake assembly or a component thereof (e.g., an intake tube), such a portion is intended to be near an output of the air intake assembly or the component in accordance with use of the air intake assembly or the component as disclosed herein. An "output end" of the air intake assembly or the component thereof includes an end near the output of the air intake assembly or the component. The output portion or the output-end portion of the air intake assembly or the component thereof can include the output end of the air intake assembly or the component, respectively; however, the output portion or the output-end portion of the air intake assembly or the component thereof need not include the output end of the air intake assembly or the component, respectively. That is, unless context suggests otherwise, the output portion or the output-end portion of the air intake assembly or the component thereof is not a terminal portion of the air intake assembly or the component.

Unless defined otherwise, all technical and scientific terms used herein have the same meaning as commonly understood by those of ordinary skill in the art.

Again, an air intake assembly is needed that efficiently separates intake air for an air filter from other air in an engine compartment of a vehicle. In addition, an air intake assembly is needed that provides relatively easy installation and maintenance of the air intake assembly. Disclosed herein are air intake assemblies and methods thereof that address at least the foregoing needs.

With respect to the air intake assemblies for internal combustion engines, for example, each air intake assembly disclosed herein includes an air filter configured to produce filtered air, a sealed filter housing configured to house the air filter therein, and an intake tube configured to convey the filtered air to an internal combustion engine. The filter housing includes an air intake port configured to provide intake air to the air filter. The air filter is configured to remove particulate matter from the intake air and produce the filtered air. The air filter includes a multi-component coupling interface configured to accept an intake-end portion of the intake tube in the coupling interface. The filter housing includes an aperture configured to accept the coupling interface of the air filter in the aperture. Methods of the foregoing air intake assemblies are set forth in detail herein below.

Air Intake Assemblies

Figure 1:
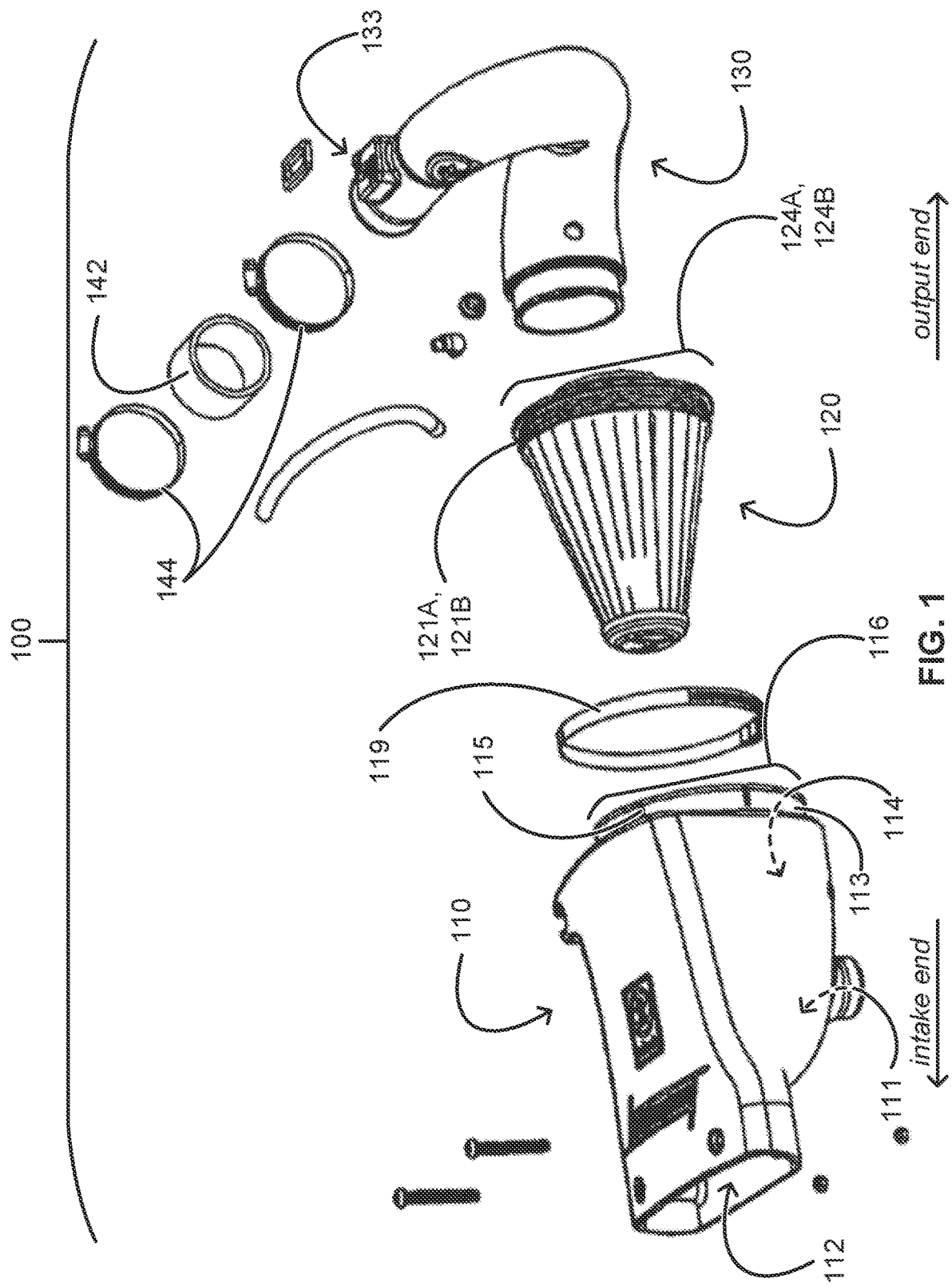
FIG. 1 illustrates a first air intake assembly in accordance with some embodiments.
Figure 2A:
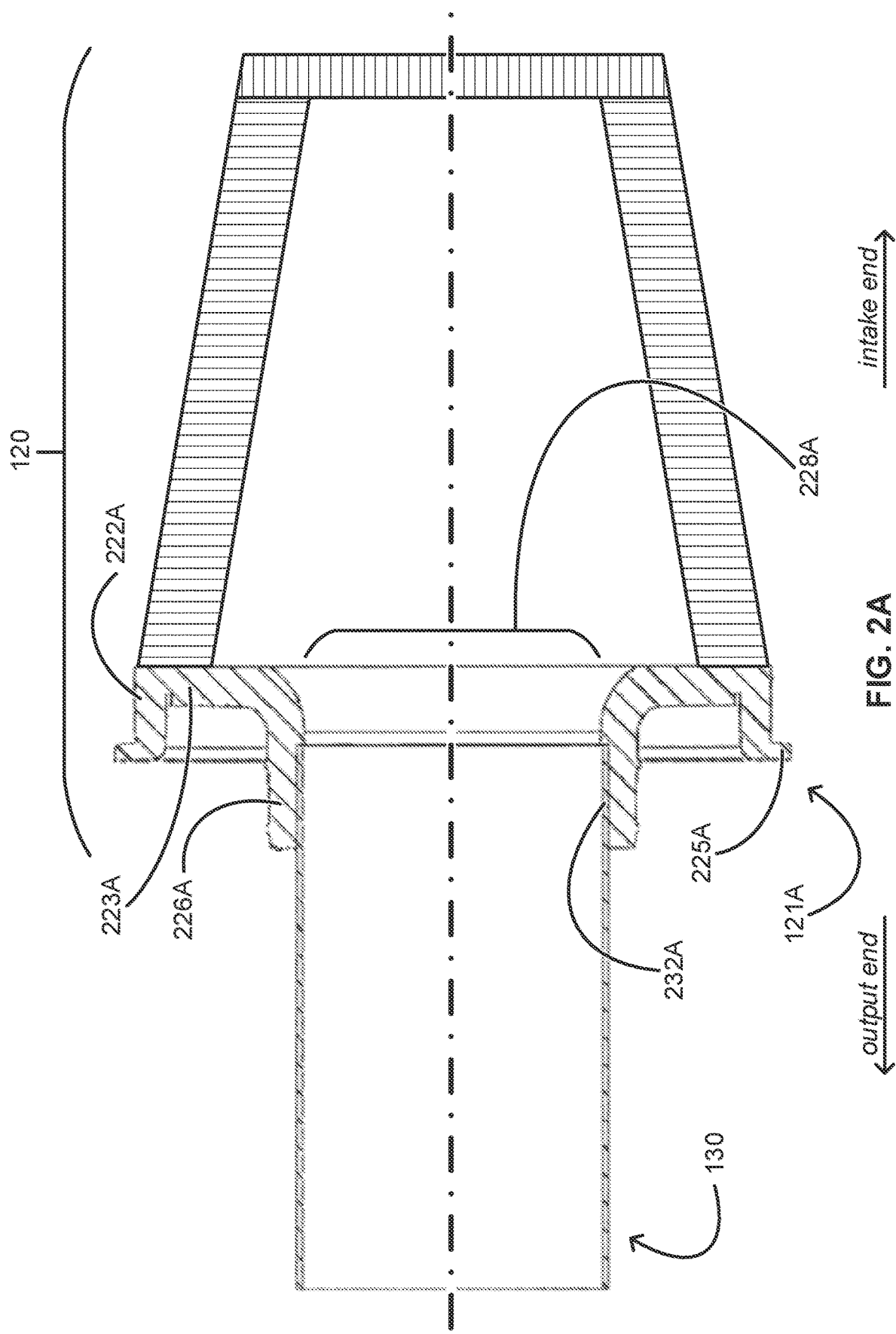
FIG. 2A illustrates a first multi-component coupling interface of an air filter for the first air intake assembly in accordance with some embodiments.
Figure 2B:
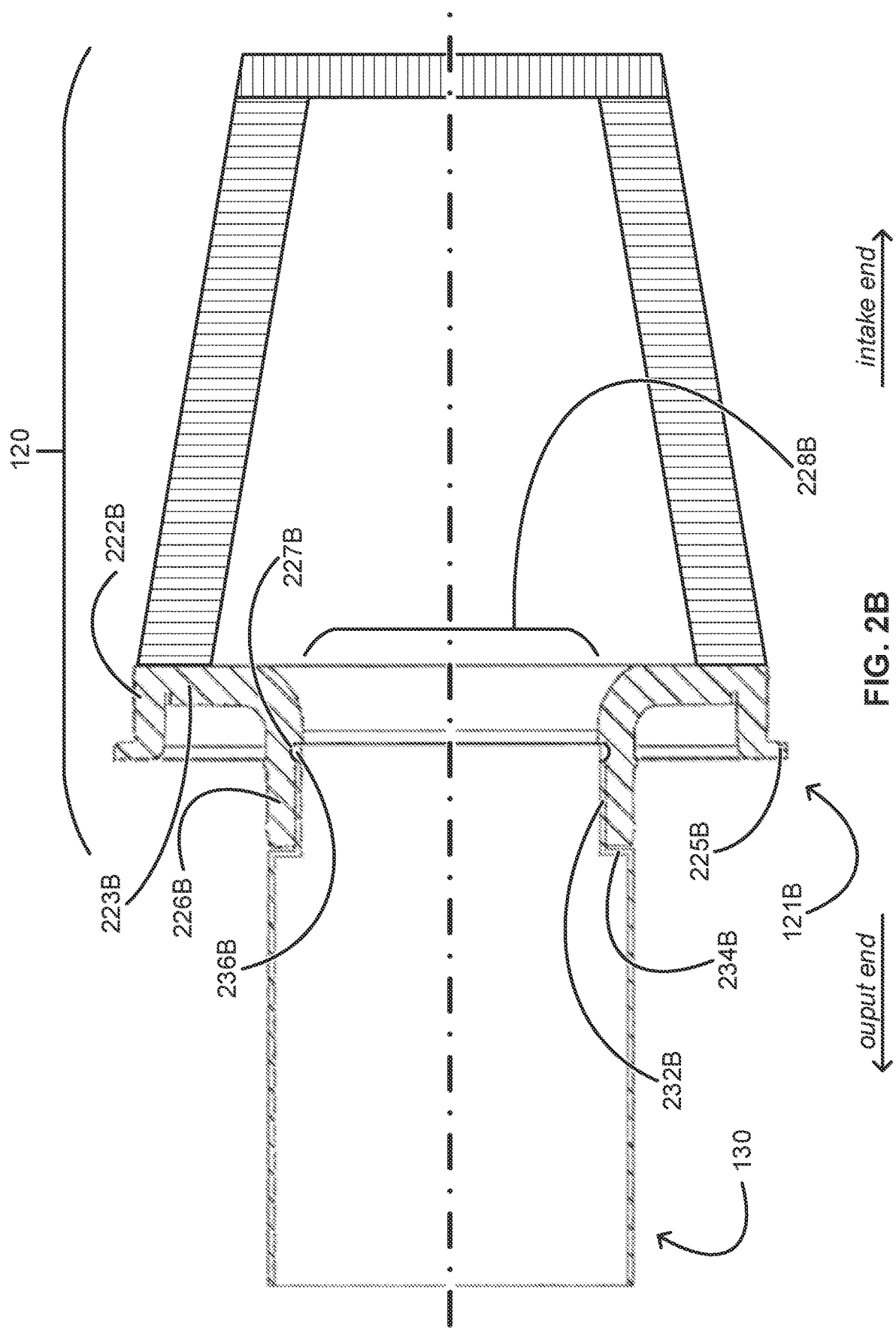
FIG. 2B illustrates a second multi-component coupling interface of the air filter for the first air intake assembly 100 in accordance with some embodiments.

FIG. 1 provides an exploded view of a first air intake assembly 100 in accordance with some embodiments. FIG. 2A illustrates a first multi-component coupling interface 121A of an air filter 120 for the first air intake assembly 100 in accordance with some embodiments. FIG. 2B illustrates a second multi-component coupling interface 121B of the air filter 120 for the first air intake assembly 100 in accordance with some embodiments. As shown, the air intake assembly 100 includes a filter housing 110, the air filter 120, and an intake tube 130. As set forth in more detail below, the filter housing 110 is configured to house the air filter 120 therein, the air filter 120 is configured to produce filtered air from intake air, and the intake tube 130 is configured to convey the filtered air to an internal combustion engine.

The filter housing 110 is configured to house the air filter 120 therein. The filter housing 110 can be a one-piece sealed filter housing. Alternatively, the filter housing 110 can be a multi-piece sealed filter housing like that of the air intake assembly 2200 of FIG. 22; however, a one-piece filter housing such as that shown for the filter housing 110 provides easier installation and maintenance of the air intake assembly 100. The filter housing 110 can be molded to accommodate the air filter 120 whether the air filter 120 is a conical air filter (as shown) or a cylindrical air filter, either one of which can optionally include an inverted intake-end end portion such as that of the air filter 420 shown in FIG. 5. The filter housing 110 can be further molded to fit in any engine compartment of a number of engine compartments of different motor-vehicle makes and models. Therefore, dimensions of the filter housing 110 vary in accordance with space available in such engine compartments.

An air intake port 112 of the filter housing 110 is configured to provide the intake air to the air filter 120. The air intake port 112 can be in any location of a number of different locations in the filter housing 110 such as opposite an aperture 114 of the filter housing 110. In addition to the air intake port 112, the filter housing 110 can include one or more window openings in a side or a top of the filter housing 110 as set forth below with respect to the air intake assembly 300 or the air intake assembly 600. One or more transparent windows or semi-transparent or opaque caps corresponding to the one or more window openings are removably or fixedly disposed in or over the one or more window openings. When a removable window or cap of the one or more windows or caps is removed from a window opening of the one or more window openings, the window opening is configured to function as an auxiliary air scoop and provide additional intake air to the air filter 120. Thus, the filter housing 110 can include one or more auxiliary air scoops to supplement the intake air provided by the air intake port 112.

When one or more windows are disposed in or over one or more window openings in the filter housing 110, the one or more windows enable a person to visually determine whether or not the air filter 120 is unacceptably dirty and should be serviced (e.g., washed, replaced, etc.). As an alternative to any one or more of the foregoing one or more windows, the filter housing 110 can include a transparent top or side of the filter housing 110 configured to enable a person to visually determine whether or not the air filter 120 should be serviced. As set forth below, the intake tube 130 can include an airflow-monitor port configured for an airflow monitor, which indicates how clogged the air filter 120 is at any given moment, thereby further enabling a person to determine whether or not the air filter 120 should be serviced. Such an airflow monitor is described in detail with respect to at least the air intake assembly 300.

The aperture 114 of the filter housing 110 is configured to accept or seat the coupling interface 121A or 121B of the air filter 120 in the aperture 114 with, for example, a clearance engineering fit (e.g., a loose-running clearance fit, a free-running clearance fit, an easy-running clearance fit, a close-running clearance fit, a sliding clearance fit, or a locational clearance fit as defined by the International Organization of Standardization ["ISO"]). Such a fit obviates a need for any fastening hardware to couple the filter housing 110 and the air filter 120 together, which facilitates installation and maintenance of the air intake assembly 100 by way of a reduced part count for the air intake assembly 100. In at least one configuration, the aperture 114 includes a lip 113 around the aperture 114 having an inner perimeter defining filter-housing socket 116 configured to accept or seat the coupling interface 121A or 121B of the air filter 120 as set forth in more detail below.

The lip 113 around the aperture 114 extends away from the filter housing 110 to form the filter-housing socket 116. The lip 113 can include a pair of opposing annular shoulders defining a clamp seat over the filter-housing socket 116. Such a clamp seat is best shown in FIG. 5 by the pair of opposing annular shoulders 517 defining the clamp seat 518 over the filter-housing socket 416 of air intake assembly 300. The lip 113 can include one or more transverse slits as indicated by the slit 115. The one or more transverse slits divide the lip 113 into one or more respective deformable lip pieces. (See, for example, the reference line for the lip 113, which also indicates one lip piece of the one or more lip pieces.) The one or more lip pieces are configured to deform toward a central axis (not shown) of the filter-housing socket 116 when an optional clamp 119 in the clamp seat is tightened. When used for fastening the air filter 120 and the filter housing 110 together, such a clamp provides a substantially airtight seal around the coupling interface 121A or 121B of the air filter 120, thereby preventing entry of unfiltered air in the air intake assembly 100 other than through the air intake port 112 or the auxiliary air scoop 111 of the filter housing 110 and maintaining airflow through an airway of the air intake assembly 100 as designed.

The air filter 120 is configured to remove particulate matter from the intake air and produce the filtered air. The air filter 120 includes filter media disposed between a pair of end pieces to which the filter media is also physically or chemically coupled. The filter media can be selected from any of a number of different types of filter media. At least one end piece of the end pieces includes the multi-component coupling interface 121A or 121B of the air filter 120.

The coupling interface 121A or 121B is a multi-component interface in that it is configured to insert in the filter-housing socket 116 of the filter housing 110 as well as accept or seat an intake-end portion of the intake tube 130 in the coupling interface 121A or 121B. The coupling interface 121A or 121B includes an outer annular member 222A or 222B and an inner annular member 226A or 226B. In at least one configuration, intake-end portions of the outer annular member 222A or 222B and the inner annular member 226A or 226B are connected by a shared annular shoulder 223A or 223B to which the air filter media is physically or chemically coupled.

The outer annular member 222A or 222B of the coupling interface 121A or 121B includes an outer perimeter defining a coupling-interface spigot 124A or 124B of the coupling interface 121A or 121B. The coupling-interface spigot 124A or 124B is configured to sit in the filter-housing socket 116 of the filter housing 110 with at least a clearance engineering fit. In at least one configuration, the coupling-interface spigot 124A or 124B includes an annular shoulder 225A or 225B providing a stop configured to prevent over-insertion of the coupling-interface spigot 124A or 124B into the filter-housing socket 116 of the filter housing 110. As best shown in FIG. 1, the outer perimeter of the outer annular member 222A or 222B of the coupling interface 121A or 121B can be optionally textured with circumferential ridges, a regular or irregular pattern of protrusions, or the like configured to optimize contact between the coupling-interface spigot 124A or 124B and the filter-housing socket 116 of the filter housing 110. Alternatively, the inner perimeter of the lip 113 of the filter-housing socket 116 can be optionally textured with the circumferential ridges, the regular or irregular pattern of protrusions, or the like to the same effect.

The inner annular member 226A or 226B of the coupling interface 121A or 121B includes an inner perimeter defining a coupling-interface, socket 228A or 228B of the coupling interface 121A or 121B. The coupling-interface socket 228A or 228B is configured to seat an intake-end portion of the intake tube 130 in the coupling interface 121A or 121B as set forth in more detail below. In at least the configuration of the coupling-interface socket 228B shown in FIG. 2B, the inner annular member 226B includes a circumferential groove 227B in the inner perimeter configured to complement a circumferential protrusion of the intake tube 130 as set forth in more detail below.

The intake tube 130 is configured to convey the filtered air from an intake-end opening of the intake tube 130 to the internal combustion engine by way of an output-end opening of the intake tube 130. Like the filter housing 110, the intake tube 130 can be molded to fit in any engine compartment of a number of engine compartments of different motor-vehicle makes and models. Therefore, dimensions of the intake tube 130 vary in accordance with space available in such engine compartments.

The intake-end portion of the intake tube 130 includes an intake-tube spigot 232A or 232B. The intake-tube spigot 232A or 232B is configured to sit in the coupling-interface socket 228A or 228B of the coupling interface 121A or 121B with at least a clearance engineering fit.

In at least the configuration of the intake-tube spigot 232B of FIG. 2B, but not limited thereto, the intake-tube spigot 232B has a smaller outer diameter than a remainder of the intake-end portion of the intake tube 130. A larger outer diameter of the remainder of the intake-end portion of the intake tube 130 provides a shouldered stop 234B configured to prevent over-insertion of the intake-tube spigot 232B into the coupling-interface socket 228B of the coupling interface 121B. By way of comparison, the outer diameter of intake-tube spigot 232A of FIG. 2A is the same as the outer diameter of the remainder of the intake-end portion of the intake tube 130.

In at least the configuration of the intake-tube spigot 232B of FIG. 2B, but not limited thereto, the intake-tube spigot 232B includes a circumferential protrusion 236B. The circumferential protrusion 236B is configured to sit in the circumferential groove 227B in the inner perimeter of the inner annular member 226B of the coupling interface 121B with at least a clearance engineering fit. By way of comparison, the intake-tube spigot 232A of FIG. 2A does not include such a circumferential protrusion. As such, the inner perimeter of the inner annular member 226A of the coupling interface 121A need not include a complementary circumferential groove.

While not shown in FIG. 2A or 2B, an outer perimeter of the intake-tube spigot 232A or 232B of the intake tube 130 can be optionally textured with circumferential ridges, a regular or irregular pattern of protrusions, or the like configured to optimize contact between the intake-tube spigot 232A or 232B and the coupling-interface socket 228A or 228B of the coupling interface 121A or 121B. Alternatively, the inner perimeter of inner annular member 226A or 226B of the coupling interface 121A or 121B can be optionally textured with the circumferential ridges, the regular or irregular pattern of protrusions, or the like to the same effect.

Whether or not the contact between the outer perimeter of the intake-tube spigot 232A or 232B of the intake tube 130 or the inner perimeter of inner annular member 226A or 226B of the coupling interface 121A or 121B is optimized by way of a textured surface, the coupling interface 121A or 121B is configured to seat the intake-tube spigot 232A or 232B in the coupling interface 121A or 121B with at least a clearance engineering fit. The clearance engineering fit obviates a need for any fastening hardware to couple together the air filter 120 and the intake tube 130, which facilitates installation and maintenance of the air intake assembly 100 by way of a reduced part count for the air intake assembly 100. That said, an optional hose clamp (not shown) can be used for fastening together the air filter 120 and the intake tube 130. An outer perimeter of the inner annular member 226A or 226B of the coupling interface 121A or 121B can include a clamp seat (not shown) for such a hose clamp.

Again, the intake tube 130 is configured to convey the filtered air from the intake-end opening of the intake tube 130 to the internal combustion engine by way of the output-end opening of the intake tube 130. Exclusive of the intake-end and output-end openings of the intake tube 130, the intake tube 130 can include one or more additional openings respectively configured for determining one or more aspects of the filtered air or the airflow through at least a portion of the airway of the air intake assembly 100 encompassed by the intake tube 130. In at least the configuration of the intake tube 130 of FIG. 1, the one or more additional openings include a mass-airflow-sensor port 133 in the intake tube 130. However, the one or more additional openings in the intake tube 130 are not limited to the mass-airflow-sensor port 133. In addition to the mass-airflow-sensor port 133, the one or more additional openings in the intake tube 130 can include, for example, an airflow-monitor port configured for an airflow monitor or a humidity sensor port configured for a humidity sensor as set forth below with respect to the air intake assembly 300. Alternatively, the intake tube 130 can include an integrated airflow monitor integrated in the intake tube 130 as set forth below with respect to the air intake assembly 300.

With respect to the mass-airflow-sensor port 133, the air intake assembly 300 can further include at least a pair of fasteners such as screws for securing a mass-airflow sensor in or over the mass-airflow-sensor port 133. Such a mass-airflow sensor can be a stock mass-airflow sensor for determining a mass flow rate of the filtered air or, in other words, the mass of the filtered air passing by the mass-airflow sensor per unit of time. Determining the mass flow rate of the filtered air is important for balancing an amount of fuel delivered to the internal combustion engine per the unit time.

The air intake assembly 100 can further include a hump coupler 142 and at least two clamps 144 configured for coupling an output-end portion of the intake tube 130 to an intake-end portion of an engine intake or a component thereof such as a boot, a hose, a mass-airflow sensor, a throttle body, turbo inlet tube, or the like. The hump coupler 142 can be at least a 2-ply silicone hump coupler and each clamp of the two clamps 144 can a stainless steel 'T'-bolt clamp.

FIG. 3 illustrates a second air intake assembly 300 in accordance with some embodiments. FIG. 4 provides an exploded view of the second air intake assembly 300 in accordance with some embodiments. FIG. 5 provides a cross-sectional view of the second air intake assembly 300 in accordance with some embodiments. As shown, the air intake assembly 300 includes a filter housing 310, an air filter 420, and an intake tube 330. As set forth in more detail below, the filter housing 310 is configured to house the air filter 420 therein, the air filter 420 is configured to produce filtered air from intake air, and the intake tube 330 is configured to convey the filtered air to an internal combustion engine.

The filter housing 310 is configured to house the air filter 420 therein. The filter housing 310 can be a one-piece sealed filter housing. Alternatively, the filter housing 310 can be a multi-piece sealed filter housing like that of the air intake assembly 2200 of FIG. 22; however, a one-piece filter housing such as that shown for the filter housing 310 provides easier installation and maintenance of the air intake assembly 300. The filter housing 310 can be molded to accommodate the air filter 420 whether the air filter 420 is a cylindrical air filter (as shown) or a conical air filter, either one of which can optionally include an inverted intake-end end portion such as that shown in FIG. 5, which increases filter-media surface area while keeping a relatively small profile for the air filter 420. The filter housing 310 can be further molded to fit in any engine compartment of a number of engine compartments of different motor-vehicle makes and models. Therefore, dimensions of the filter housing 310 vary in accordance with space available in such engine compartments.

An air intake port 312 of the filter housing 310 is configured to provide the intake air to the air filter 420. The air intake port 312 can be in any location of a number of different locations in the filter housing 310 such as opposite an aperture 414 of the filter housing 310. In addition to the air intake port 312, the filter housing 310 can include one or more window openings in a side or a top of the filter housing 310 such as window opening 411a in a side of the filter housing 310. One or more transparent windows or semi-transparent or opaque caps corresponding to the one or more window openings such as window 411b or window 411c are removably or fixedly disposed in or over the one or more window openings. When a removable window (e.g., the window 411b) or cap of the one or more windows or caps is removed from a window opening (e.g., the window opening 411a) of the one or more window openings, the window opening is configured to function as an auxiliary air scoop and provide additional intake air to the air filter 420. Thus, the filter housing 310 can include one or more auxiliary air scoops to supplement the intake air provided by the air intake port 312.

When one or more windows are disposed in or over one or more window openings in the filter housing 310 such as the window 411b in or over the window opening 411a, the one or more windows enable a person to visually determine whether or not the air filter 420 is unacceptably dirty and should be serviced (e.g., washed, replaced, etc.). As an alternative to any one or more of the foregoing one or more windows, the filter housing 310 can include a transparent top or side of the filter housing 310 configured to enable a person to visually determine whether or not the air filter 420 should be serviced. As set forth below, the intake tube 330 includes the airflow-monitor port 331 configured for an airflow monitor, which indicates how clogged the air filter 420 is as any given moment, thereby further enabling a person to determine whether or not the air filter 420 should be serviced.

The aperture 414 of the filter housing 310 is configured to accept or seat a coupling interface 321 of the air filter 420 in the aperture 414 with, for example, a clearance engineering fit. Such a fit obviates a need for any fastening hardware to couple the filter housing 310 and the air filter 420 together, which facilitates installation and maintenance of the air intake assembly 300 by way of a reduced part count for the air intake assembly 300. In at least one configuration, the aperture 414 includes a lip 413 around the aperture 414 having an inner perimeter defining a filter-housing socket 416 configured to accept or seat the coupling interface 321 of the air filter 420 as set forth in more detail below.

The lip 413 around the aperture 414 extends away from the filter housing 310 to form the filter-housing socket 416. The lip 413 can include a pair of opposing annular shoulders 517 defining a clamp seat 518 over the filter-housing socket 416. The lip 413 can include one or more transverse slits as indicated by the slit 415. The one or more transverse slits divide the lip 413 into one or more respective deformable lip pieces. (See, for example, the reference line for the lip 413, which also indicates one lip piece of the one or more lip pieces.) The one or more lip pieces are configured to deform toward a central axis (not shown) of the filter-housing socket 416 when an optional clamp 419 in the clamp seat is tightened. When used for fastening the air filter 420 and the filter housing 310 together, such a clamp provides a substantially airtight seal around the coupling interface 321 of the air filter 420, thereby preventing entry of unfiltered air in the air intake assembly 300 other than through the air intake port 312 or the auxiliary air scoop 411a of the filter housing 310 and maintaining airflow through an airway of the air intake assembly 300 as designed.

The air filter 420 is configured to remove particulate matter from the intake air and produce the filtered air. The air filter 420 includes filter media disposed between a pair of end pieces to which the filter media is also physically or chemically coupled. The filter media can be selected from any of a number of different types of filter media. At least one end piece of the end pieces includes the multi-component coupling interface 321 of the air filter 420.

The coupling interface 321 is a multi-component interface in that it is configured to insert in the filter-housing socket 416 of the filter housing 310 as well as accept or seat an intake-end portion of the intake tube 330 in the coupling interface 321. The coupling interface 321 includes an outer annular member 522 and an inner annular member 526. In at least one configuration, intake-end portions of the outer annular member 522 and the inner annular member 526 are connected by a shared annular shoulder 523 to which the air filter media is physically or chemically coupled.

The outer annular member 522 of the coupling interface 321 includes an outer perimeter defining a coupling-interface spigot 424 of the coupling interface 321. The coupling-interface spigot 424 is configured to sit in the filter-housing socket 416 of the filter housing 310 with at least a clearance engineering fit. In at least one configuration, the coupling-interface spigot 424 includes an annular shoulder 525 providing a stop configured to prevent over-insertion of the coupling-interface spigot 424 into the filter-housing socket 416 of the filter housing 310. As best shown in FIG. 5, the outer perimeter of the outer annular member 522 of the coupling interface 321 can be optionally textured with circumferential ridges, a regular or irregular pattern of protrusions, or the like configured to optimize contact between the coupling-interface spigot 424 and the filter-housing socket 416 of the filter housing 310. Alternatively, the inner perimeter of the lip 413 of the filter-housing socket 416 can be optionally textured with the circumferential ridges, the regular or irregular pattern of protrusions, or the like to the same effect.

The inner annular member 526 of the coupling interface 321 includes an inner perimeter defining a coupling-interface socket 528 of the coupling interface 321. The coupling-interface socket 528 is configured to seat an intake-end portion of the intake tube 330 in the coupling interface 321 as set forth in more detail below. In at least the configuration of the coupling-interface socket 528 shown in FIG. 5, the inner annular member 526 includes a circumferential groove 527 in the inner perimeter configured to complement a circumferential protrusion of the intake tube 330 as set forth in more detail below. As further shown in FIG. 5, the inner perimeter of inner annular member 526 can be optionally textured with the circumferential ridges, a regular or irregular pattern of protrusions, or the like configured to optimize contact between the coupling-interface socket 528 and the intake-end portion of the intake tube 330 in the coupling interface 321. Alternatively, an outer perimeter of the intake-end end portion of the intake tube 330 can be optionally textured with circumferential ridges, a regular or irregular pattern of protrusions, or the like to the same effect.

The intake tube 330 is configured to convey the filtered air from an intake-end opening of the intake tube 330 to the internal combustion engine by way of an output-end opening of the intake tube 330. Like the filter housing 310, the intake tube 330 can be molded to fit in any engine compartment of a number of engine compartments of different motor-vehicle makes and models. Therefore, dimensions of the intake tube 330 vary in accordance with space available in such engine compartments.

The intake-end portion of the intake tube 330 includes an intake-tube spigot 532. The intake-tube spigot 532 is configured to sit in the coupling-interface socket 528 of the coupling interface 321 with at least a clearance engineering fit.

In at least the configuration of the intake-tube spigot 532 of FIG. 5, but not limited thereto, the intake-tube spigot 532 has a smaller outer diameter than a remainder of the intake-end portion of the intake tube 330. A larger outer diameter of the remainder of the intake-end portion of the intake tube 330 provides a shouldered stop 534 configured to prevent over-insertion of the intake-tube spigot 532 into the coupling-interface socket 528 of the coupling interface 321. Like the outer diameter of intake-tube spigot 232A of FIG. 2A, the outer diameter of the intake-tube spigot 532 can alternatively be the same as the outer diameter of the remainder of the intake-end portion of the intake tube 330 in some embodiments.

In at least the configuration of the intake-tube spigot 532 of FIG. 5, but not limited thereto, the intake-tube spigot 532 includes a circumferential protrusion 536. The circumferential protrusion 536 is configured to sit in the circumferential groove 527 in the inner perimeter of the inner annular member 526 of the coupling interface 321 with at least a clearance engineering fit. The clearance engineering fit of the intake-tube spigot 532 and the circumferential protrusion 536 thereof in the coupling-interface socket 528 having the circumferential groove 527 obviates a need for any fastening hardware to couple together the air filter 420 and the intake tube 330, which facilitates installation and maintenance of the air intake assembly 300 by way of a reduced part count for the air intake assembly 300. That said, an optional hose clamp 329 can be used for fastening together the air filter 420 and the intake tube 330. An outer perimeter of the inner annular member 526 of the coupling interface 321 can include a clamp seat (not shown) for the hose clamp 329.

Like the intake-tube spigot 232A of FIG. 2A, the intake-tube spigot 532 need not include the circumferential protrusion 536 in some embodiments. In such embodiments, the inner perimeter of the inner annular member 526 of the coupling interface 321 also need not include the complementary circumferential groove 527.

Again, the intake tube 330 is configured to convey the filtered air from the intake-end opening of the intake tube 330 to the internal combustion engine by way of the output-end opening of the intake tube 330. Exclusive of the intake-end and output-end openings of the intake tube 330, the intake tube 330 can include one or more additional openings respectively configured for determining one or more aspects of the filtered air or the airflow through at least a portion of the airway of the air intake assembly 300 encompassed by the intake tube 330. In at least the configuration of the intake tube 330 of FIGS. 3-5, the one or more additional openings include, but are not limited to, an airflow-monitor port 331, a mass-airflow-sensor port 333, and a humidity-sensor port 335 in the intake tube 330.

With respect to the airflow-monitor port 331, the air intake assembly 300 can further include a grommet (e.g., a rubber grommet) and a plug configured for the airflow-monitor port 331. While not shown, the grommet lines the airflow-monitor port 331 and the plug is removably disposed in the grommet-lined airflow-monitor port 331 when the grommet and the plug are provided with the air intake assembly 300. The plug is configured for use when a mechanical airflow monitor is not disposed in the airflow-monitor port 331 and in use for determining restriction of the airflow through the air intake assembly 300.

As an alternative to the airflow-monitor port 331 in the intake tube 330, the filter housing 310 can alternatively include the airflow-monitor port 331; however, it is preferable to monitor filtered air from the intake tube 330 with an airflow monitor, Monitoring the filtered air from the intake tube 330 avoids the particulate matter present in the intake air, accumulation of which in the airflow monitor can lead to inaccurate airflow monitoring.

As an alternative to the airflow-monitor port 331 in the intake tube 330 or the filter housing 310, either the intake tube 330 or the filter housing 310 can include an integrated airflow monitor integrated in the intake tube 330 or the filter housing 310.

Whether the airflow monitor is provided or obtained separately and disposed in the airflow-monitor port 331 or integrated in the intake tube 330 or the filter housing 310, the airflow monitor is configured to mechanically monitor restriction of airflow through the air intake assembly 300, which restriction is progressive due to filter media of the air filter 420 becoming progressively clogged with the particulate matter from the intake air. An indicator of the airflow monitor indicates how clogged the air filter 420 is at any given moment, thereby enabling a person to determine whether or not the air filter 420 should be serviced.

The airflow monitor can include a moveable piston disposed in a substantially transparent and colorless tube having airflow-related graduations, colors, or both the graduations and the colors printed on the tube. An end of the piston behind the graduations or the colors printed on the tube serves as the indicator of the airflow monitor. The indicator of the airflow monitor indicates how clogged the air filter 420 is at the moment the end of the piston is positioned behind the graduations or the colors printed on the tube.

The airflow monitor can alternatively include a pivotable needle mounted over a multi-colored band (e.g., a band having green, yellow, and red segments) related to airflow, A tip of the needle serves as the indicator of the airflow monitor as the needle sweeps across the multi-colored band. The indicator of the airflow monitor indicates how clogged the air filter 420 is at the moment the tip of the needle is positioned over the multi-colored band.

With respect to the mass-airflow-sensor port 333, the air intake assembly 300 can further include at least a pair of fasteners such as screws for securing a mass-airflow sensor in or over the mass-airflow-sensor port 333. Such a mass-airflow sensor can be a stock mass-airflow sensor for determining a mass flow rate of the filtered air or, in other words, the mass of the filtered air passing by the mass-airflow sensor per unit of time. Determining the mass flow rate of the filtered air is important for balancing an amount of fuel delivered to the internal combustion engine per the unit time.

With respect to the humidity-sensor port 335, the air intake assembly 300 can further include a gasket (not shown), a cover 339 configured to cover the humidity-sensor port 335, and at least a pair of fasteners such as screws for securing a humidity sensor in or over the humidity-sensor port 335. When the gasket, the cover 339, and the pair of screws are provided with the air intake assembly 300, the gasket lines the humidity-sensor port 335 and the cover 339 is removably disposed over the humidity-sensor port 335 with the pair of screws. At least the cover 339 is configured for use when a humidity sensor is not disposed in or over the humidity-sensor port 335 and in use for determining humidity of the filtered air in the intake tube 330. Determining the humidity of the filtered air can be important for automatically adjusting an amount and type of air used for a motor vehicle's air conditioning system.

The air intake assembly 300 can further include a hump coupler 342 and at least two clamps 344 configured for coupling an output-end portion of the intake tube 330 to an intake-end portion of an engine intake or a component thereof such as a boot, a hose, a mass-airflow sensor, a throttle body, a turbo inlet tube, or the like. The hump coupler 342 can be at least a 2-ply silicone hump coupler and each clamp of the two clamps 344 can a stainless steel 'T'-bolt clamp.

FIG. 6 illustrates a third air intake assembly 600 in accordance with some embodiments. FIG. 7 provides an exploded view of the third air intake assembly 600 in accordance with some embodiments. FIG. 8 provides a cross-sectional view of the third air intake assembly 600 in accordance with some embodiments. As shown, the air intake assembly 600 includes a filter housing 610, an air filter 720, and an intake tube 630. As set forth in more detail below, the filter housing 610 is configured to house the air filter 720 therein, the air filter 720 is configured to produce filtered air from intake air, and the intake tube 630 is configured to convey the filtered air to an internal combustion engine.

The filter housing 610 is configured to house the air filter 720 therein. The filter housing 610 can be a one-piece sealed filter housing. Alternatively, the filter housing 610 can be a multi-piece sealed filter housing like that of the air intake assembly 2200 of FIG. 22; however, a one-piece filter housing such as that shown for the filter housing 610 provides easier installation and maintenance of the air intake assembly 600. The filter housing 610 can be molded to accommodate the air filter 720 whether the air filter 720 is a conical air filter (as shown) or a cylindrical air filter, either one of which can optionally include an inverted intake-end end portion such as that shown in FIG. 8, which increases filter-media surface area while keeping a relatively small profile for the air filter 720. The filter housing 610 can be further molded to fit in any engine compartment of a number of engine compartments of different motor-vehicle makes and models. Therefore, dimensions of the filter housing 610 vary in accordance with space available in such engine compartments.

An air intake port 612 of the filter housing 610 is configured to provide the intake air to the air filter 720. The air intake port 612 can be in any location of a number of different locations in the filter housing 610 such as opposite an aperture 714 of the filter housing 610. In addition to the air intake port 612, the filter housing 610 can include one or more window openings in a side or a top of the filter housing 610 such as window opening 711a in a side of the filter housing 610. One or more transparent windows or semi-transparent or opaque caps corresponding to the one or more window openings such as window 711b or window 711c are removably or fixedly disposed in or over the one or more window openings. When a removable window (e.g., the window 711b) or cap of the one or more windows or caps is removed from a window opening (e.g., the window opening 711a) of the one or more window openings, the window opening is configured to function as an auxiliary air scoop and provide additional intake air to the air filter 720. Thus, the filter housing 610 can include one or more auxiliary air scoops to supplement the intake air provided by the air intake port 612.

When one or more windows are disposed in or over one or more window openings in the filter housing 610 such as the window 711b in or over the window opening 711a, the one or more windows enable a person to visually determine whether or not the air filter 720 is unacceptably dirty and should be serviced (e.g., washed, replaced, etc.). As an alternative to any one or more of the foregoing one or more windows, the filter housing 610 can include a transparent top or side of the filter housing 610 configured to enable a person to visually determine whether or not the air filter 720 should be serviced. As set forth below, the intake tube 630 can include an airflow-monitor port configured for an airflow monitor, which indicates how clogged the air filter 720 is at any given moment, thereby further enabling a person to determine whether or not the air filter 720 should be serviced. Such an airflow monitor is described in detail with respect to at least the air intake assembly 300.

The aperture 714 of the filter housing 610 is configured to accept or seat a coupling interface 621 of the air filter 720 in the aperture 714 with, for example, a clearance engineering fit. Such a fit obviates a need for any fastening hardware to couple the filter housing 610 and the air filter 720 together, which facilitates installation and maintenance of the air intake assembly 600 by way of a reduced part count for the air intake assembly 600. In at least one configuration, the aperture 714 includes a lip 713 around the aperture 714 having an inner perimeter defining a filter-housing socket 716 configured to accept or seat the coupling interface 621 of the air filter 720 as set forth in more detail below.

Instead of the lip 713 extending away from the filter housing 610 like the lip 113 of the filter housing 110 or the lip 413 of the filter housing 310, the lip 713 extends into the filter housing 610 to form the filter-housing socket 716. The lip 713 can be biased toward a central axis (not shown) of the filter-housing socket 716 such that when the coupling interface 621 of the air filter 720 is inserted therein, the lip 713 deforms away from the central axis of the filter-housing socket 716 but remains biased toward the central axis, thereby clamping the coupling interface 621 in the filter-housing socket 716. In this way, the lip 713 around the aperture 714 of the filter housing 610 forms an integrated clamp. Such clamping by the integrated clamp can enhance an otherwise substantially airtight seal around the coupling interface 621 of the air filter 720. The airtight seal prevents entry of unfiltered air in the air intake assembly 600 other than through the air intake port 612 or the auxiliary air scoop 711a of the filter housing 610 and maintains airflow through an airway of the air intake assembly 600 as designed.

While not shown, the lip 713 can include one or more transverse slits like the slit 115 in the lip 113 of the filter housing 110 or the slit 415 in the lip 413 of the filter housing 310. When such one or more slits are present, the one or more slits divide the lip 713 into one or more respective deformable lip pieces. As set forth above, the lip 713, or the one or more lip pieces thereof, can be biased toward the central axis (not shown) of the filter-housing socket 716 such that when the coupling interface 621 of the air filter 720 is inserted therein, the one or more lip pieces deform away from the central axis of the filter-housing socket 716 but remain biased toward the central axis, thereby clamping the coupling interface 621 in the filter-housing socket 716. In this way, the lip 713, or the one or more lip pieces thereof, around the aperture 714 of the filter housing 610 forms an integrated clamp. Again, such clamping by the integrated clamp can enhance an otherwise substantially airtight seal around the coupling interface 621 of the air filter 720.

The air filter 720 is configured to remove particulate matter from the intake air and produce the filtered air. The air filter 720 includes filter media disposed between a pair of end pieces to which the filter media is also physically or chemically coupled. The filter media can be selected from any of a number of different types of filter media. At least one end piece of the end pieces includes the multi-component coupling interface 621 of the air filter 720.

The coupling interface 621 is a multi-component interface in that it is configured to insert in the filter-housing socket 716 of the filter housing 610 as well as accept or seat an intake-end portion of the intake tube 630 in the coupling interface 621. The coupling interface 621 includes an outer annular member 822 and an inner annular member 826. In at least one configuration, intake-end portions of the outer annular member 822 and the inner annular member 826 are connected by a shared annular shoulder 823 to which the air filter media is physically or chemically coupled.

The outer annular member 822 of the coupling interface 621 includes an outer perimeter defining a coupling-interface spigot 724 of the coupling interface 621. The coupling-interface spigot 724 is configured to sit in the filter-housing socket 716 of the filter housing 610 with at least a clearance engineering fit. In at east one configuration, the coupling-interface spigot 724 includes an annular shoulder 825 providing a stop configured to prevent over-insertion of the coupling-interface spigot 724 into the filter-housing socket 716 of the filter housing 610. While not shown, the outer perimeter of the outer annular member 822 of the coupling interface 621 can be optionally textured with circumferential ridges, a regular or irregular pattern of protrusions, or the like configured to optimize contact between the coupling-interface spigot 724 and the filter-housing socket 716 of the filter housing 610. Alternatively, the inner perimeter of the lip 713 of the filter-housing socket 716 can be optionally textured with the circumferential ridges, the regular or irregular pattern of protrusions, or the like to the same effect.

The inner annular member 826 of the coupling interface 621 includes an inner perimeter defining a coupling-interface socket 828 of the coupling interface 621. The coupling-interface socket 828 is configured to seat an intake-end portion of the intake tube 630 in the coupling interface 621 as set forth in more detail below. In at least the configuration of the coupling-interface socket 828 shown in FIG. 8, the inner annular member 826 includes a circumferential groove 827 in the inner perimeter configured to complement a circumferential protrusion of the intake tube 630 as set forth in more detail below. As further shown in FIG. 8, the inner perimeter of inner annular member 826 can be optionally textured with the circumferential ridges, a regular or irregular pattern of protrusions, or the like configured to optimize contact between the coupling-interface socket 828 and the intake-end portion of the intake tube 630 in the coupling interface 621. Alternatively, an outer perimeter of the intake-end end portion of the intake tube 630 can be optionally textured with circumferential ridges, a regular or irregular pattern of protrusions, or the like to the same effect.

The intake tube 630 is configured to convey the filtered air from an intake-end opening of the intake tube 630 to the internal combustion engine by way of an output-end opening of the intake tube 630. Like the filter housing 610, the intake tube 630 can be molded to fit in any engine compartment of a number of engine compartments of different motor-vehicle makes and models. Therefore, dimensions of the intake tube 630 vary in accordance with space available in such engine compartments.

The intake-end portion of the intake tube 630 includes an intake-tube spigot 832. The intake-tube spigot 832 is configured to sit in the coupling-interface socket 828 of the coupling interface 621 with at least a clearance engineering fit. In at least the configuration of the intake-tube spigot 832 of FIG. 8, but not limited thereto, the intake-tube spigot 832 has a smaller outer diameter than a remainder of the intake-end portion of the intake tube 630. A larger outer diameter of the remainder of the intake-end portion of the intake tube 630 provides a shouldered stop 834 configured to prevent over-insertion of the intake-tube spigot 832 into the coupling-interface socket 828 of the coupling interface 621. Like the outer diameter of intake-tube spigot 232A of FIG. 2A, the outer diameter of the intake-tube spigot 832 can alternatively be the same as the outer diameter of the remainder of the intake-end portion of the intake tube 630 in some embodiments.

In at least the configuration of the intake-tube spigot 832 of FIG. 8, but not limited thereto, the intake-tube spigot 832 includes a circumferential protrusion 836. The circumferential protrusion 836 is configured to sit in the circumferential groove 827 in the inner perimeter of the inner annular member 826 of the coupling interface 621 with at least a clearance engineering fit. The clearance engineering fit of the intake-tube spigot 832 and the circumferential protrusion 836 thereof in the coupling-interface socket 828 having the circumferential groove 827 obviates a need for any fastening hardware to couple together the air filter 720 and the intake tube 630, which facilitates installation and maintenance of the air intake assembly 600 by way of a reduced part count for the air intake assembly 600. That said, an optional hose clamp 629 can be used for fastening together the air filter 720 and the intake tube 630. An outer perimeter of the inner annular member 826 of the coupling interface 621 can include a clamp seat (not shown) for the hose clamp 629.

Like the intake-tube spigot 232A of FIG. 2A, the intake-tube spigot 832 need not include the circumferential protrusion 836 in some embodiments. As such, the inner perimeter of the inner annular member 826 of the coupling interface 621 also need not include the complementary circumferential groove 827.

Again, the intake tube 630 is configured to convey the filtered air from the intake-end opening of the intake tube 630 to the internal combustion engine by way of the output-end opening of the intake tube 630. Exclusive of the intake-end and output-end openings of the intake tube 630, the intake tube 630 can include one or more additional openings respectively configured for determining one or more aspects of the filtered air or the airflow through at least a portion of the airway of the air intake assembly 600 encompassed by the intake tube 630. In at least the configuration of the intake tube 630 of FIGS. 6-8, the one or more additional openings include a mass-airflow-sensor port 833 in the intake tube 630. However, the one or more additional openings in the intake tube 630 are not limited to the mass-airflow-sensor port 833. In addition to the mass-airflow-sensor port 833, the one or more additional openings in the intake tube 630 can include, for example, an airflow-monitor port configured for an airflow monitor or a humidity sensor port configured for a humidity sensor as set forth above with respect to the air intake assembly 300. Alternatively, the intake tube 630 can include an integrated airflow monitor integrated in the intake tube 630 as set forth above with respect to the air intake assembly 300.

With respect to the mass-airflow-sensor port 833, the air intake assembly 600 can further include at least a pair of fasteners such as screws for securing a mass-airflow sensor in or over the mass-airflow-sensor port 833. Such a mass-airflow sensor can be a stock mass-airflow sensor for determining a mass flow rate of the filtered air or, in other words, the mass of the filtered air passing by the mass-airflow sensor per unit of time. Determining the mass flow rate of the filtered air is important for balancing an amount of fuel delivered to the internal combustion engine per the unit time.

The air intake assembly 600 can further include a hump coupler 642 and at least two clamps 644 configured for coupling an output-end portion of the intake tube 630 to an intake-end portion of an engine intake or a component thereof such as a boot, a hose, a mass-airflow sensor, a throttle body, a turbo inlet tube, or the like. The hump coupler 642 can be at least a 2-ply silicone hump coupler and each clamp of the two clamps 644 can a stainless steel 'T'-bolt clamp.

Coupling Mechanisms for the Air Intake Assemblies

As set forth above, each air intake assembly of air intake assemblies 100, 300, and 600 includes a first coupling mechanism between the air filter 120, 420, or 720 and the filter housing 110, 310, or 610 for coupling together the air filter 120, 420, or 720 and the filter housing 110, 310, or 610. Each air intake assembly of air intake assemblies 100, 300, and 600 also includes a second coupling mechanism between the air filter 120, 420, or 720 and the intake tube 130, 330, or 630 for coupling together the air filter 120, 420, or 720 and the intake tube 130, 330, or 630.

With respect to the coupling mechanism between the air filter 120, 420, or 720 and the filter housing 110, 310, or 610, for example, the filter-housing socket 116, 416, or 716 of the filter housing 110, 310, or 610 is configured to accept or seat the coupling-interface spigot 124A, 124B, 424, or 724 of the air filter 120, 420, or 720 with, for example, at least a clearance engineering fit upon inserting the coupling-interface spigot 124A, 124B, 424, or 724 into the filter-housing socket 116, 416, or 716. Optionally, at least one of the filter-housing socket 116, 16, or 716 or the coupling-interface spigot 124A, 124B, 424, or 724 is textured to optimize contact between the filter-housing socket 116, 416, or 716 and the coupling-interface spigot 124A, 124B, 424, or 724. In addition, the lip 113 or 413 around the aperture 114 or 414 of the filter housing 110 or 310 includes the clamp seat over the filter-housing socket 116 or 416 for clamping the coupling-interface spigot 124A, 124B, or 424 of the air filter 120 or 420 in the filter-housing socket 116 or 416 of the filter housing 110 or 310. Differently, the lip 713 around the around the aperture 714 of the filter housing 610 forms an integrated clamp for clamping the coupling-interface spigot 724 of the air filter 720 in the filter-housing socket 716 of the filter housing 610.

With respect to the coupling mechanism between the air filter 120, 420, or 720 and the intake tube 130, 330, or 630, for example, the coupling-interface socket 228A, 228B, 528, or 828 of the air filter 120, 420, or 720 is configured to accept or seat the intake-tube spigot 232A, 232B, 532, or 832 of the intake tube 130, 330, or 630 with, for example, at least a clearance engineering fit upon inserting the intake-tube spigot 232A, 232B, 532, or 832 into the coupling-interface socket 228A, 228B, 528, or 828. Optionally, at least one of the coupling-interface socket 228A, 228B, 528, or 828 or the intake-tube spigot 232A, 232B, 532, or 832 is textured to optimize contact between the coupling-interface socket 228A, 228B, 528, or 828 and the intake-tube spigot 232A, 2328, 532, or 832. In addition, the circumferential groove 227B, 527, or 827 in the inner perimeter of the inner annular member 226B, 526, or 826 of the coupling-interface socket 228B, 528, or 828 is configured to accept or seat the circumferential protrusion 236B, 536, or 836 of the intake-tube spigot 232B, 532, or 832 with at least a clearance engineering fit upon coupling together the air filter 120, 420, or 720 and the intake tube 130, 330, or 630.

While the coupling mechanism between the air filter 120, 420, or 720 and the filter housing 110, 310, or 610 or the coupling mechanism between the air filter 120, 420, or 720 and the intake tube 130, 330, or 630 can be any coupling mechanism of those set forth above, it should be understood the coupling mechanism for coupling together the air filter 120, 420, or 720 and the filter housing 110, 310, or 610 and the coupling mechanism for coupling together the air filter 120, 420, or 720 and the intake tube 130, 330, or 630 are not limited to those set forth above. Indeed, additional coupling mechanisms are set forth below for coupling together the air filter 120, 420, or 720 and the filter housing 110, 310, or 610, as well as for coupling together the air filter 120, 420, or 720 and the intake tube 130, 330, or 630. Depending upon the coupling mechanism, the coupling mechanism can include one or more fasteners, which one or more fasteners can be integrated into the coupling mechanism, provided with the coupling mechanism, or both.

FIG. 9 illustrates a coupling mechanism between an air filter 920 and an intake tube 930 for coupling together the air filter 920 and the intake tube 930 in accordance with some embodiments.

As shown, the coupling mechanism between the air filter 920 and the intake tube 930 includes a plurality of catch-tipped extension legs 937 extending from an intake-tube spigot 932 of the intake tube 930. The catch-tipped extension legs 937 are configured to extend past an intake end of a coupling-interface socket 928 of the air filter 920. Upon coupling together the air filter 920 and the intake tube 930, the catch-tipped extension legs 937 of the intake-tube spigot 932 catch the intake end of the coupling-interface socket 928.

FIG. 10 illustrates a coupling mechanism between an air filter 1020 and an intake tube 1030 for coupling together the air filter 1020 and the intake tube 1030 in accordance with some embodiments.

As shown, the coupling mechanism between the air filter 1020 and the intake tribe 1030 includes a plurality of directional channels 1029 in or on an inner perimeter of a coupling-interface socket 1028 of the air filter 1020 and a corresponding plurality of protrusions 1037 on an outer perimeter of an intake-tube spigot 1032 of the intake tube 1030. When coupling together the air filter 1020 and the intake tube 1030, the protrusions 1037 of the intake-tube spigot 1032 advance along the directional channels 1029 of the coupling-interface socket 1028.

While the coupling mechanism between the air filter 1020 and the intake tube 1030 can have the foregoing configuration, the coupling mechanism can alternatively include the plurality of directional channels 1029 in or on the outer perimeter of the intake-tube spigot 1032 of the intake tube 1030 and the corresponding plurality of protrusions 1037 on the inner perimeter of the coupling-interface socket 1028 of the air filter 1020.

FIG. 11 illustrates a coupling mechanism between an air filter 1120 and an intake tube 1130 for coupling together the air filter 1120 and the intake tube 1130 in accordance with some embodiments.

As shown, the coupling mechanism between the air filter 1120 and the intake tube 1130 includes continuous internal threads 1129 in an inner perimeter of a coupling-interface socket 1128 of the air filter 1120 and corresponding continuous external threads 1137 on an intake-tube spigot 1132 of the intake tube 1130. When coupling together the air filter 1120 and the intake tube 1130, the intake-tube spigot 1132 screws into the coupling-interface socket 1128 by way of the continuous external threads 1137 of the intake-tube spigot 1132 and the continuous internal threads 1129 of the coupling-interface socket 1128.

FIG. 12 illustrates a coupling mechanism between an air filter 1220 and an intake tube 1230 for coupling together the air filter 1220 and the intake tube 1230 in accordance with some embodiments.

As shown, the coupling mechanism between the air filter 1220 and the intake tube 1230 includes non-continuous internal threads 1229 in or on an inner perimeter of a coupling-interface socket 1228 of the air filter 1220 and a corresponding plurality of lugs 1237 on an outer perimeter of an intake-tube spigot 1232 of the intake tube 1230. When coupling together the air filter 1220 and the intake tube 1230, the intake-tube spigot 1232 screws into the coupling-interface socket 1228 by way of the lugs 1237 of the intake-tube spigot 1232 and the non-continuous internal threads 1229 of the coupling-interface socket 1228.

While the coupling mechanism between the air filter 1220 and the intake tube 1230 can have the foregoing configuration, the coupling mechanism can alternatively include the non-continuous internal threads 1229 as non-continuous external threads in or on the outer perimeter of the intake-tube spigot 1232 of the intake tube 1230 and the corresponding plurality of lugs 1237 on the inner perimeter of a coupling-interface socket 1228 of the air filter 1220.

While the coupling mechanisms between the air filters 920, 1020, 1120, and 1220 and the corresponding intake tubes 930, 1030, 1130, and 1230 can have the configurations set forth above, each coupling mechanism of the foregoing coupling mechanisms can incorporate or even substitute the features of any other coupling mechanism set forth herein including any other coupling mechanism of the coupling mechanisms between the air filters 1320, 1620, and 1820 and the corresponding filter housings 1310, 1610, and 1810 set forth below.

FIG. 13 illustrates two coupling mechanisms between an air filter 1320 and a filter housing 1310 for coupling together the air filter 1320 and the filter housing 1310 in accordance with some embodiments.

FIG. 14 illustrates in detail one of the two coupling mechanisms of FIG. 13 in accordance with some embodiments.

As shown, the coupling mechanism between the air filter 1320 and the filter housing 1310 includes a plurality of clevis pins 1419a extending from the filter housing 1310 around a filter-housing socket 1316 of the filter housing 1310, a corresponding plurality of through holes 1429 through an annular shoulder 1325 of a coupling-interface spigot 1324 of the air filter 1320, and a corresponding plurality of split pins 1419b or retainer clips. Upon coupling together the air filter 1320 and the filter housing 1310, the clevis pins 1419a extend through the through holes 1429 of the annular shoulder 1325 of the coupling-interface spigot 1324 and the split pins 1419b or the retainer clips extend through though holes of the clevis pins 1419a.

While the coupling mechanism between the air filter 1320 and the filter housing 1310 can have the foregoing configuration, the coupling mechanism can alternatively include a plurality of bolts and a corresponding plurality of nuts in place of the clevis pins 1419a and the split pins 1419h, respectively.

FIG. 15 illustrates in detail another one of the alternative coupling mechanisms of FIG. 13 in accordance with some embodiments.

As shown, the coupling mechanism between the air filter 1320 and the filter housing 1310 includes a plurality of twist locks 1519 extending from the filter housing 1310 around the filter-housing socket 1316 of the filter housing 1310 and a corresponding plurality of through holes 1529 through the annular shoulder 1325 of the coupling-interface spigot 1324 of the air filter 1320. Upon coupling together the air filter 1320 and the filter housing 1310, a plurality of twist-lock pins of the twist-locks 1519 extend through the through holes 1529 of the annular shoulder 1325 of the coupling-interface spigot 1324 and each twist-lock pin of the twist-lock pins is twisted into its locked position.

FIG. 16 illustrates a coupling mechanism between an air filter 1620 and a filter housing 1610 for coupling together the air filter 1620 and the filter housing 1610 in accordance with some embodiments. FIG. 17 illustrates in detail the coupling mechanism of FIG. 16 in accordance with some embodiments.

The coupling mechanism between the air filter 1620 and the filter housing 1610 includes a plurality of ball-lock pins 1619*a*, a corresponding plurality of ball-lock-pin receivers 1619*b* in the filter housing 1610 around a filter-housing socket 1616 of the filter housing 1610, and a corresponding plurality of through holes 1629 through an annular shoulder 1625 of a coupling-interface spigot 1624 of the air filter 1620. Upon coupling together the air filter 1620 and the filter housing 1610, the ball-lock pins 1619*a* extend through the through holes 1629 of the annular shoulder 1625 of the coupling-interface spigot 1624 and into the ball-lock-pin receivers 1619*b* in the filter housing 1610.

While the coupling mechanism between the air filter 1620 and the filter housing 1610 can have the foregoing configuration, the coupling mechanism can alternatively include a plurality of bolts and a corresponding plurality of bolt receivers in place of the of ball-lock pins 1619*a* and the ball-lock-pin receivers 1619*b*, respectively.

FIG. 18 illustrates a coupling mechanism between an air filter 1820 and a filter housing 1810 for coupling together the air filter 1820 and the filter housing 1810 in accordance with some embodiments.

The coupling mechanism between the air filter 1820 and the filter housing 1810 includes a plurality of buckles 1819*a* disposed on the filter housing 1810 around a filter-housing socket 1816 and an annular catch 1829 integrated into an annular shoulder 1825 of a coupling-interface spigot 1824 of the air filter 1820. Upon coupling together the air filter 1820 and the filter housing 1810, a plurality of wire-formed hooks 1819*b* of the buckles 1819*a* engage the annular catch 1829 of the coupling-interface spigot 1824 and each handle of a plurality of handles 1819*c* of the buckles 1819*a* is in its locked position.

While the coupling mechanisms between the air filters 1320, 1620, and 1820 and the corresponding filter housings 1310, 1610, and 1810 can have the configurations set forth above, each coupling mechanism of the foregoing coupling mechanisms can incorporate or even substitute the features of any other coupling mechanism set forth herein including any other coupling mechanism of the coupling mechanisms between the air filters 920, 1020, 1120, and 1220 and the corresponding intake tubes 930, 1030, 1130, and 1230.

Methods

Methods of the air intake assemblies 100, 300, and 600 include methods for making and using the air intake assemblies 100, 300, and 600, At least one method for making the air intake assemblies 100, 300, and 600 is set forth below, and at least one method for using (e.g., installing) the air intake assemblies 100, 300, and 600 is set forth below. Other methods or features of the methods set forth below for making and using the air intake assemblies 100, 300, and 600 can be discerned from the description set forth above for the air intake assemblies 100, 300, and 600 or the components thereof. For expository expediency, the methods for making and using the air intake assemblies 100, 300, and 600 set forth below are described with respect to the air intake assembly 100. It should be understood that description set forth below with respect to the air intake assembly 100 also applies to the air intake assemblies 300 and 600 unless context suggest otherwise.

A method of making the air intake assembly 100 includes, but is not limited to, molding the end pieces for the air filter 120, wherein at least one end piece of the end pieces includes the multi-component coupling interface 121A or 121B for the air filter 120; coupling the end pieces to filter media to form the air filter 120; molding the filter housing 110 configured to house the air filter 120 therein, wherein the filter housing 110 includes the aperture 114 and the air intake port 112 configured to provide the intake air to the air filter 120 for producing the filtered air by removing particulate matter from the intake air; and molding the intake tube 130 configured to convey the filtered air from the air filter 120 to an internal combustion engine. The coupling interface 121A or 121B of the air filter 120 is configured to accept or seat the intake-end portion of the intake tube 130 in the coupling interface 121A or 121B. The aperture 114 of the filter housing 110 is configured to accept or seat the coupling interface 121A or 121B of the air filter 120 in the aperture 114.

Molding the end pieces of the air filter 120 includes molding the inner annular member 226A or 226B and the outer annular member 222A or 222B of the coupling interface 121A or 121B. The inner annular member 226A or 226B of the coupling interface 121A or 121B defines the coupling-interface socket 228A or 228B. The outer annular member 222A or 222B of the coupling interface 121A or 121B defines the coupling-interface spigot 124A or 124B.

Molding the end pieces of the air filter 120 includes molding the shared annular shoulder 223A or 223B between intake-end portions of the inner annular member 226A or 226B and the outer annular member 222A or 222B of the coupling interface 121A or 121B.

Molding the intake tube 130 includes molding the intake-tube spigot 232A or 232B in the intake-end portion of the intake tube 130. The intake-tube spigot 232A or 232B is configured to sit in the coupling-interface socket 228A or 228B with at least a clearance engineering ft.

Molding the intake tube 130 includes molding the intake-tube spigot 232B with the circumferential protrusion 236B, In addition, molding the end pieces of the air filter 120 includes molding the coupling-interface socket 228B with the circumferential groove 227B. The circumferential groove 227B of the coupling-interface socket 228B is configured to seat therein the circumferential protrusion 236B of the intake-tube spigot 232B with at least a clearance engineering fit.

Molding the intake tube 130 includes molding the intake-tube spigot 232B with the smaller outer diameter than the remainder of the intake-end portion of the intake tube 130. The remainder of the intake-end portion of the intake tube 130 is molded with the larger outer diameter providing the shouldered stop 234B configured to prevent over-insertion of the intake-tube spigot 232B into the coupling-interface socket 228B.

Molding the filter housing 110 includes molding the lip 113 around the aperture 114 of the filter housing 110. The lip 113 around the aperture 114 defines the filter-housing socket 116 configured to seat therein the coupling-interface spigot 124A or 124B with at least a clearance engineering fit.

Molding the filter housing 110 includes molding the lip 113 around the aperture 14 with the pair of opposing annular shoulders. The pair of opposing annular shoulders defines the clamp seat over the filter-housing socket 116. Such a clamp seat is best shown in FIG. 5 by the pair of opposing annular shoulders 517 defining the clamp seat 518 over the filter-housing socket 416 of air intake assembly 300.

Molding the filter housing 110 includes molding the lip 113 around the aperture 114 with the one or more transverse slits dividing the lip 113 into the one or more respective deformable lip pieces. The one or more deformable pieces are configured to deform toward the central axis of the filter-housing socket 116 when the clamp in the clamp seat is tightened.

Molding the end pieces of the air filter 120 includes molding the annular shoulder 225A or 225B of the coupling-interface spigot 124A or 124B as the stop configured to prevent over-insertion of the coupling-interface spigot 124A or 124B into the filter-housing socket 116.

Molding at least the filter housing 110 and the intake tube 130 is in accordance with space available in engine compartments of different makes and models of motor vehicles.

The method further includes cutting a length of hose to produce the hump coupler 142. The hump coupler 142 is configured for coupling the output-end portion of the intake tube 130 to an intake-end portion of an engine intake or a component thereof.

The method further includes packaging the air filter 120, the filter housing 110, the intake tube 130, the hump coupler 142, and the at least two clamps 144 in a suitably sized package with optional package inserts (e.g., information regarding the air intake assembly 100, instructions for installing the air intake assembly 100, etc.) for shipping, retail sale, or both shipping and retail sale.

A method of installing the air intake assembly 100 in an engine compartment of a motor vehicle includes, but is not limited to, obtaining the air filter 120 of the air intake assembly 100, wherein the air filter 120 includes the multi-component coupling interface 121A or 121B; inserting the air filter 120 into the aperture 114 of the filter housing 110 of the air intake assembly 100 by way of the coupling interface 121A or 121B of the air filter 120; placing the filter housing 110 including the air filter 120 in the engine compartment in place of another air intake assembly; and inserting an intake-end portion of the intake tube 130 of the air intake assembly 100 into the coupling interface 121A or 121B of the air filter 120.

Inserting the air filter 120 into the aperture 114 of the filter housing 110 includes inserting the coupling-interface spigot 124A or 124B of the air filter 120 into the filter-housing socket 116 of the filter housing 110. The coupling-interface spigot 124A or 124B is defined by the outer annular member 222A or 222B of the coupling interface 121A or 121B of the air filter 120, The filter-housing socket 116 is defined by the lip 113 around the aperture 114 of the filter housing 110.

Inserting the intake-end portion of the intake tube 130 into the coupling interface 121A or 121B of the air filter 120 includes inserting the intake-tube spigot 232A or 232B of the intake tube 130 into the coupling-interface socket 228A or 228B of the air filter 120. The coupling-interface socket 228A or 228B is defined by the inner annular member 226A or 226B of the coupling interface 121A or 121B of the air filter 120.

The method further includes coupling the output-end portion of the intake tube 130 to an intake of the internal combustion engine with the hump coupler 142 between the intake tube 130 and the internal combustion engine; securing the hump coupler 142 by tightening a first 'T' bolt clamp of the two clamps 144 over the hump coupler 142 at the output-end portion of the intake tube 130; and securing the hump coupler 142 by tightening a second 'T'-bolt clamp of the two clamps 144 over the hump coupler 142 at the intake of the internal combustion engine.

The method further includes placing a mass-airflow sensor in or over the mass-airflow-sensor port 133 in the intake tube 130; and securing the mass-airflow sensor in or over the mass-airflow-sensor port 133 with a pair of screws.

While an airflow-monitor port is not shown in FIGS. 1 and 2A-2B for the air intake assembly 100, the method can further include lining an airflow-monitor port in the intake tube 130 with a rubber grommet; and inserting an airflow monitor in the airflow-monitor port lined with the rubber grommet. Such an airflow-monitor port can be like that of the airflow-monitor port 331 of the intake tube 330 of the air intake assembly 300.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein,

What is claimed is:

1. A method of installing an air intake assembly for an internal combustion engine in an engine compartment of a motor vehicle, comprising:
    obtaining an air filter of the air intake assembly, the air filter including a multi-component coupling interface;
    inserting the air filter into an aperture of a filter housing of the air intake assembly by way of the coupling interface of the air filter;
    placing the filter housing including the air filter in the engine compartment in place of another air intake assembly; and
    inserting an intake-end portion of an intake tube of the air intake assembly into the coupling interface of the air filter.

2. The method of claim 1, wherein inserting the air filter into the aperture of the filter housing includes inserting a coupling-interface spigot defined by an outer annular member of the coupling interface of the air filter into a filter-housing socket defined by a lip around the aperture of the filter-housing.

3. The method of claim 1, wherein the filter housing is sealed.

4. The method of claim 1, wherein the air intake portion is configured to provide intake air to the air filter for producing filtered air by removing particulate matter from the intake air.

5. The method of claim 1, wherein the intake tube is configured to convey the filtered air from the air filter to the internal combustion engine.

6. The method of claim 1, wherein inserting the intake-end portion of the intake tube into the coupling interface of the air filter includes inserting an intake-tube spigot of the intake tube into a coupling-interface socket defined by an inner annular member of the coupling interface of the air filter.

7. The method of claim 1, wherein the air intake assembly includes a shared annular shoulder between an intake-end portion of the inner annular member and an intake-end portion of the outer annular member of the coupling interface.

8. The method of claim 1, further comprising:
coupling an output-end portion of the intake tube to an intake of the internal combustion engine with a hump coupler between the intake tube and the internal combustion engine;
securing the hump coupler by tightening a first 'T'-bolt clamp over the hump coupler at the output-end portion of the intake tube; and
securing the hump coupler by tightening a second 'T'-bolt clamp over the hump coupler at the intake of the internal combustion engine.

9. The method of claim 1, further comprising:
placing a mass-airflow sensor in or over a mass-airflow-sensor port in the intake tube; and
securing the mass-airflow sensor in or over the mass-airflow-sensor port with a pair of screws.

10. The method of claim 1, further comprising:
lining an airflow-monitor port in the intake tube with a rubber grommet; and
inserting an airflow monitor in the airflow-monitor port lined with the rubber grommet.

11. A method of installing an air intake assembly for an internal combustion engine in an engine compartment of a motor vehicle, comprising:
obtaining an air filter configured to remove particulate matter from intake air to produce filtered air, the air filter including a multi-component coupling interface;
inserting the air filter into an aperture of a filter housing of the air intake assembly, the filter housing including an air intake port configured to provide the intake air to the air filter; and
inserting an intake-end portion of an intake tube of the air intake assembly into the coupling interface of the air filter, the intake tube configured to convey the filtered air to the internal combustion engine;
wherein a window is disposed in or over a window opening in a side or a top of the filter housing and configured to enable a person to determine whether or not the air filter should be serviced.

12. The method of claim 11, further comprising disposing at least one pair of windows and at least one pair of corresponding window openings in the filter housing.

13. The method of claim 11, wherein a first window of the pair of windows is removably disposed in or over a first window opening of the pair of window openings in a side of the filter housing, and wherein a second window of the pair of windows is fixedly disposed in or over a second window opening of the pair of window openings in a top of the filter housing.

14. The method of claim 13, wherein the first window opening doubles as an auxiliary air scoop and is configured to provide additional intake air to the air filter when the first window is removed from the first window opening.

15. The method of claim 12, wherein a second opening of the one or more additional openings is configured as a mass-airflow-sensor port in the intake tube.

16. The method of claim 11, further comprising disposing an airflow-monitor port in the intake tube.

17. The method of claim 16, further comprising disposing a mechanical airflow monitor in the airflow-monitor port.

18. The method of claim 11, further comprising lining a rubber grommet in the airflow-monitor port; and disposing a removable plug in the airflow-monitor port.

19. The method of claim 11, further comprising lining a gasket in a humidity-sensor port in the intake tube; and disposing a removable cover over the humidity sensor port.

20. A method of installing an air intake assembly for an internal combustion engine in an engine compartment of a motor vehicle, comprising:
obtaining an air filter of the air intake assembly, the air filter including a multi-component coupling interface;
inserting the air filter into an aperture of a filter housing of the air intake assembly by way of the coupling interface of the air filter,
wherein inserting the air filter into the aperture of the filter housing includes inserting a coupling-interface spigot defined by an outer annular member of the coupling interface of the air filter into a filter-housing socket defined by a lip around the aperture of the filter-housing;
placing the filter housing including the air filter in the engine compartment in place of another air intake assembly; and
inserting an intake-end portion of an intake tube of the air intake assembly into the coupling interface of the air filter,
wherein inserting the intake-end portion of the intake tube into the coupling interface of the air filter includes inserting an intake-tube spigot of the intake tube into a coupling-interface socket defined by an inner annular member of the coupling interface of the air filter.

* * * * *